(12) United States Patent
Luong et al.

(10) Patent No.: US 8,265,181 B2
(45) Date of Patent: Sep. 11, 2012

(54) PHASE TRACKING IN FREQUENCY DOMAIN IN A WIRELESS COMMUNICATION SYSTEM

(75) Inventors: Le Nguyen Luong, San Diego, CA (US); Shrenik Patel, San Diego, CA (US); Stefan Franz, Munich (DE)

(73) Assignee: Qualcomm Incorporated, San Diego, CA (US)

( * ) Notice: Subject to any disclaimer, the term of this patent is extended or adjusted under 35 U.S.C. 154(b) by 820 days.

(21) Appl. No.: 12/423,363

(22) Filed: Apr. 14, 2009

(65) Prior Publication Data
US 2010/0260233 A1    Oct. 14, 2010

(51) Int. Cl.
H04L 27/28    (2006.01)
(52) U.S. Cl. ........................................ 375/260; 375/324
(58) Field of Classification Search .................. 375/260, 375/324, 327, 340
See application file for complete search history.

(56) References Cited

U.S. PATENT DOCUMENTS

| | | | |
|---|---|---|---|
| 6,466,630 B1* | 10/2002 | Jensen | 375/327 |
| 6,549,561 B2 | 4/2003 | Crawford | |
| 6,577,690 B1* | 6/2003 | Barman et al. | 375/354 |
| 6,633,616 B2 | 10/2003 | Crawford | |
| 6,888,905 B1 | 5/2005 | Cheah et al. | |
| 7,486,747 B1* | 2/2009 | Bagley et al. | 375/324 |
| 8,085,876 B2* | 12/2011 | Gaikwad et al. | 375/324 |
| 2003/0128660 A1* | 7/2003 | Ito et al. | 370/210 |
| 2004/0208263 A1* | 10/2004 | Rives et al. | 375/327 |
| 2005/0175113 A1 | 8/2005 | Okuyama | |
| 2006/0171361 A1* | 8/2006 | Meilhac et al. | 370/335 |
| 2010/0102889 A1* | 4/2010 | Azenkot et al. | 331/17 |

FOREIGN PATENT DOCUMENTS
WO    WO03028205    4/2003

OTHER PUBLICATIONS

International Search Report and Written Opinion—PCT/US2010/031045, International Search Authority—European Patent Office—Nov. 29, 2010.
"WiMedia Draft 1.1.70E: MultiBand OFDM Physical Layer Specification", Dec. 2006, WiMedia Alliance, Inc.
"WiMedia MultiBand OFDM Physical Layer Specification", Version 1.2, Feb. 2007, WiMedia Alliance, Inc.
Section 5.3.8 of U. Mengali and A. N. D'Andrea, "Synchronization Techniques for Digital Receivers", Plenum Press, 1997.

* cited by examiner

*Primary Examiner* — Emmanuel Bayard
(74) *Attorney, Agent, or Firm* — Qualcomm Patent Group; Alan Gordon; James H. Yancey, Jr.

(57) ABSTRACT

Techniques for correcting sampling frequency offset (SFO) and carrier frequency offset (CFO) in a wireless communication system are disclosed. An apparatus for correcting SFO and CFO may include a pilot tone extractor for extracting a plurality of pilot tones from one or more first symbols, a demodulator, an error signal generator, a loop filter, an angle generator, and a device for applying a correction phase to one or more symbols subsequent to the one or more first symbols. The demodulator is configured to demodulate the pilot tones. The error signal generator is configured to generate an error signal by summing and calculating the arctangent of the plurality of demodulated pilot tones. The loop filter is configured to generate an estimated phase rotation due to a residual CFO and the angle generator is configured to generate a correction phase for the plurality of tones.

24 Claims, 11 Drawing Sheets

FIG. 7A

| Symbol Index $i$ | Tone Index $l$ | Phase Factor (in degree) | | | |
|---|---|---|---|---|---|
| | | $\Delta f^r = 5kHz$ | $\Delta f^r = 10kHz$ | $\Delta f^r = 20kHz$ | $\Delta f^r = 30kHz$ |
| $N_{preamble} + 1$ | 1 | 2.0 | 4.0 | 7.9 | 11.9 |
| | 23 | 3.5 | 5.4 | 9.4 | 13.3 |
| | 56 | 5.6 | 7.6 | 11.5 | 15.5 |
| $N_{preamble} + 2$ | 1 | 2.6 | 5.1 | 10.2 | 15.3 |
| | 23 | 4.5 | 7.0 | 12.0 | 17.1 |
| | 56 | 7.2 | 9.7 | 14.8 | 19.9 |
| $N_{preamble} + 3$ | 1 | 3.2 | 6.3 | 12.5 | 18.7 |
| | 23 | 5.4 | 8.5 | 14.7 | 20.9 |
| | 56 | 8.8 | 11.9 | 18.1 | 24.3 |
| $N_{preamble} + 4$ | 1 | 3.8 | 7.4 | 14.7 | 22.1 |
| | 23 | 6.4 | 10.1 | 17.4 | 24.7 |
| | 56 | 10.4 | 14.1 | 21.4 | 28.7 |
| $N_{preamble} + 5$ | 1 | 4.4 | 8.6 | 17.0 | 25.5 |
| | 23 | 7.4 | 11.6 | 20.1 | 28.5 |
| | 56 | 12.0 | 16.2 | 24.7 | 331. |
| $N_{preamble} + 6$ | 1 | 4.9 | 9.7 | 19.3 | 28.8 |
| | 23 | 8.4 | 13.2 | 22.8 | 32.3 |
| | 56 | 13.6 | 18.4 | 28.0 | 37.5 |

FIG. 7B

| Symbol Index $i$ | Phase Error, $\theta_{e,l}$ |
|---|---|
| k | $-2.5\kappa(\varepsilon_{\it eff} + l\eta)$ |
| k + 1 | $-1.5\kappa(\varepsilon_{\it eff} + l\eta)$ |
| k + 2 | $-0.5\kappa(\varepsilon_{\it eff} + l\eta)$ |
| k + 3 | $0.5\kappa(\varepsilon_{\it eff} + l\eta)$ |
| k + 4 | $1.5\kappa(\varepsilon_{\it eff} + l\eta)$ |
| k + 5 | $2.5\kappa(\varepsilon_{\it eff} + l\eta)$ |

| Residual CFO | Phase Error, $\theta_{e,1}$ (degree) | Phase Error, $\theta_{e,23}$ (degree) | Phase Error, $\theta_{e,56}$ (degree) |
|---|---|---|---|
| 5 kHz | 1.5 | 2.5 | 4.0 |
| 10 kHz | 2.9 | 3.9 | 5.4 |
| 20 kHz | 5.7 | 6.7 | 8.2 |
| 30 kHz | 8.5 | 9.5 | 11.0 |

703

PHASE TRACKING IN FREQUENCY DOMAIN IN A WIRELESS COMMUNICATION SYSTEM

BACKGROUND

1. Field

This disclosure is generally related to wireless communications, and more particularly, to techniques for correcting sampling frequency offset (SFO) and carrier frequency offset (CFO).

2. Background

Wireless communications systems, for example, orthogonal frequency division multiplexing (OFDM) based ultra wide band (UWB) wireless communication systems, generally suffer from SFO and CFO degradation of signals sent from a transmitter to a receiver. Various techniques have been employed to minimize SFO and CFO in communications systems. However, the previous attempts remain inadequate to provide optimum performance with lower power consumption and reduced complexity in some communication systems.

SUMMARY

Disclosed herein is a new and improved approach for reducing sampling frequency offset (SFO) and carrier frequency offset (CFO) in communication systems.

In accordance with an aspect of the approach, an apparatus includes a pilot tone extractor configured to extract a plurality of pilot tones from one or more first symbols; a demodulator configured to demodulate the pilot tones; an error signal generator configured to generate an error signal by summing and calculating the arctangent of the plurality of demodulated pilot tones; a loop filter configured to generate an estimated phase rotation due to a residual CFO; an angle generator configured to generate a correction phase for the plurality of pilot tones; and a device configured to apply the correction phase to one or more symbols subsequent to the one or more first symbols.

In accordance with another aspect of the approach, a method of correcting SFO and CFO in a wireless communication system generally includes collecting a plurality of modulated weighted pilot tones associated with one or more first symbols; demodulating the plurality of modulated weighted pilot tones; generating an error signal by summing and then calculating the arctangent of the plurality of demodulated weighted pilot tones; passing the error signal through a loop filter to generate an estimated phase rotation due to a residual CFO; and applying one or more correction phases to one or more symbols subsequent to the one or more first symbols.

In accordance with a further aspect of the approach, a computer-readable medium, embodying a set of instructions executable by one or more processors, includes code for collecting a plurality of modulated weighted pilot tones associated with one or more first symbols; code for demodulating the plurality of modulated weighted pilot tones; code for generating an error signal by summing and then calculating the arctangent of the plurality of demodulated weighted pilot tones; code for passing the error signal through a loop filter to generate an estimated phase rotation due to a residual CFO; and code for applying one or more correction phases to one or more symbols subsequent to the one or more first symbols.

In accordance with a yet another aspect of the approach, an apparatus includes means for collecting a plurality of modulated weighted pilot tones associated with one or more first symbols, means for demodulating the plurality of modulated weighted pilot tones; means for generating an error signal by summing and then calculating the arctangent of the plurality of demodulated weighted pilot tones; means for generating an estimated phase rotation due to a residual CFO; means for generating a correction phase for the plurality of tones; and means for applying the correction phases to one or more symbols subsequent to the one or more first symbols.

Other systems, methods, aspects, features, embodiments and advantages of the improved approach for reducing SFO and CFO in wireless communication systems disclosed herein will be, or will become, apparent to one having ordinary skill in the art upon examination of the following drawings and detailed description. It is intended that all such additional systems, methods, aspects, features, embodiments and advantages be included within this description, and be within the scope of the accompanying claims.

BRIEF DESCRIPTION OF THE DRAWINGS

It is to be understood that the drawings are solely for purpose of illustration. Furthermore, the components in the figures are not necessarily to scale, emphasis instead being placed upon illustrating the principles of the apparatuses, articles of manufacture and methods disclosed herein. In the figures, like reference numerals designate corresponding parts throughout the different views.

FIG. 7A is a table for illustrating a method for multiple-symbol phase tracking in the frequency domain in a wireless communication system.

FIG. 7B is a second table for illustrating the method for multiple-symbol phase tracking in the frequency domain in a wireless communication system.

FIG. 7C is a third table for illustrating the method for multiple-symbol phase tracking in the frequency domain in a wireless communication system.

DETAILED DESCRIPTION

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

The word "exemplary" is used herein to mean "serving as an example, instance, or illustration." Any embodiment, component or variant described herein as "exemplary" is not necessarily to be construed as preferred or advantageous over other embodiments, components or variants. All of the embodiments, components and variants described in this description are exemplary embodiments, components and variants provided to enable persons skilled in the art to make and use the invention, and not necessarily to limit the scope of legal protection afforded the appended claims.

Figure 1:
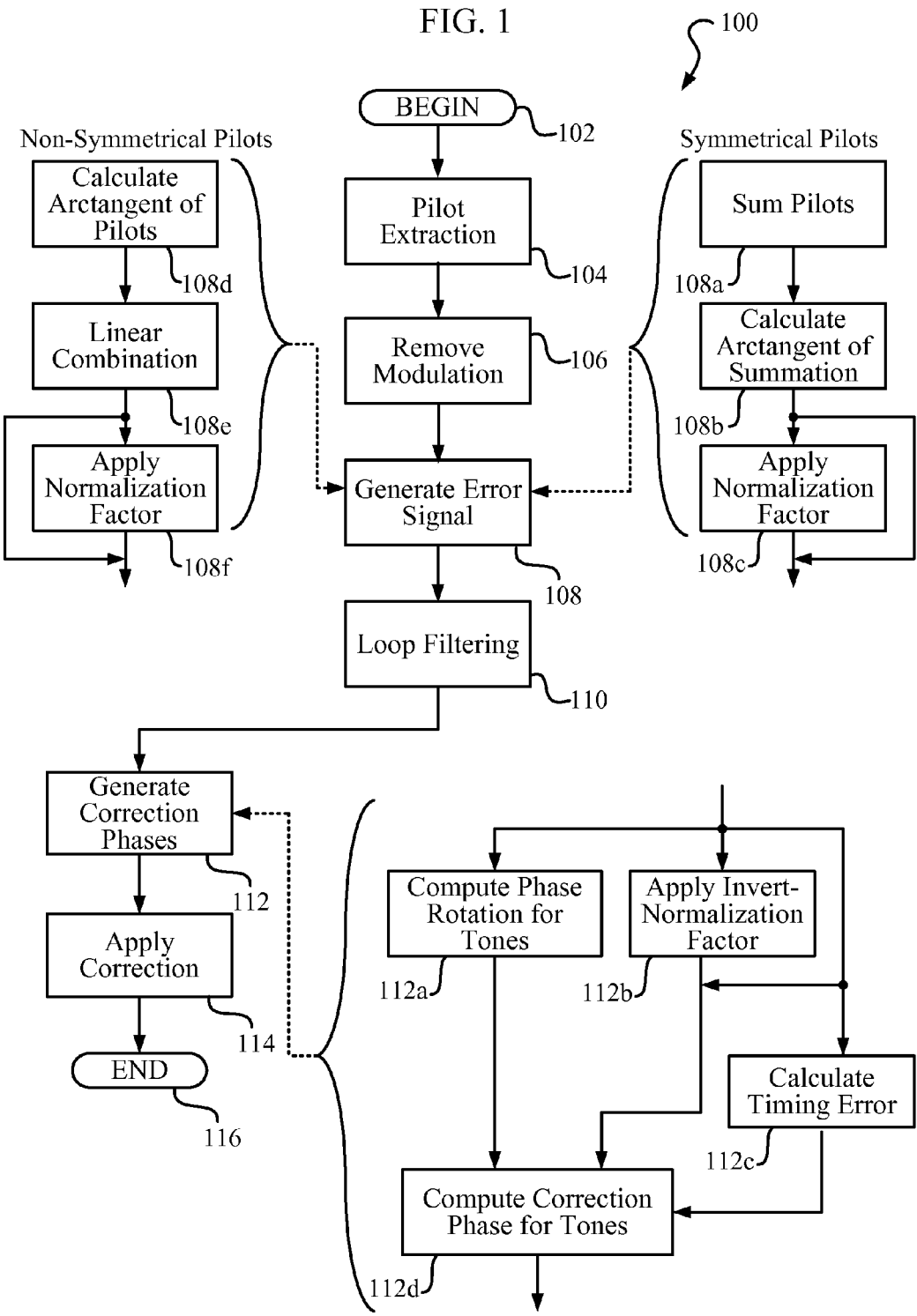
FIG. 1 is a flowchart illustrating a method for single symbol phase tracking in the frequency domain in a wireless communication system.

FIG. 1 shows a flowchart illustrating a single symbol phase tracking method 100 for phase tracking in the frequency domain in a wireless communication system. For purposes of illustration, the description of the single symbol phase tracking method 100 provided herein refers to the tracking system 200 shown in FIG. 2, where exemplary functional blocks may be useful for illustration. The method 100 is described in brief initially herein, and further aspects of method are described in greater detail after the description of the exemplary tracking system 200, and after a signal model is described that may be useful in describing the system 200 and method 100. The method 100 may begin, or be called to operate, with block 102.

In block 104, pilot tones are extracted from a first symbol, for example, pilot tones may be extracted from a weighted OFDM symbol and/or a corrected OFDM symbol. The first symbol may be considered a first symbol in a series of symbols, or an intermediate symbol in the series that is a first symbol in relation to one or more subsequent symbols in the series.

Figure 2:
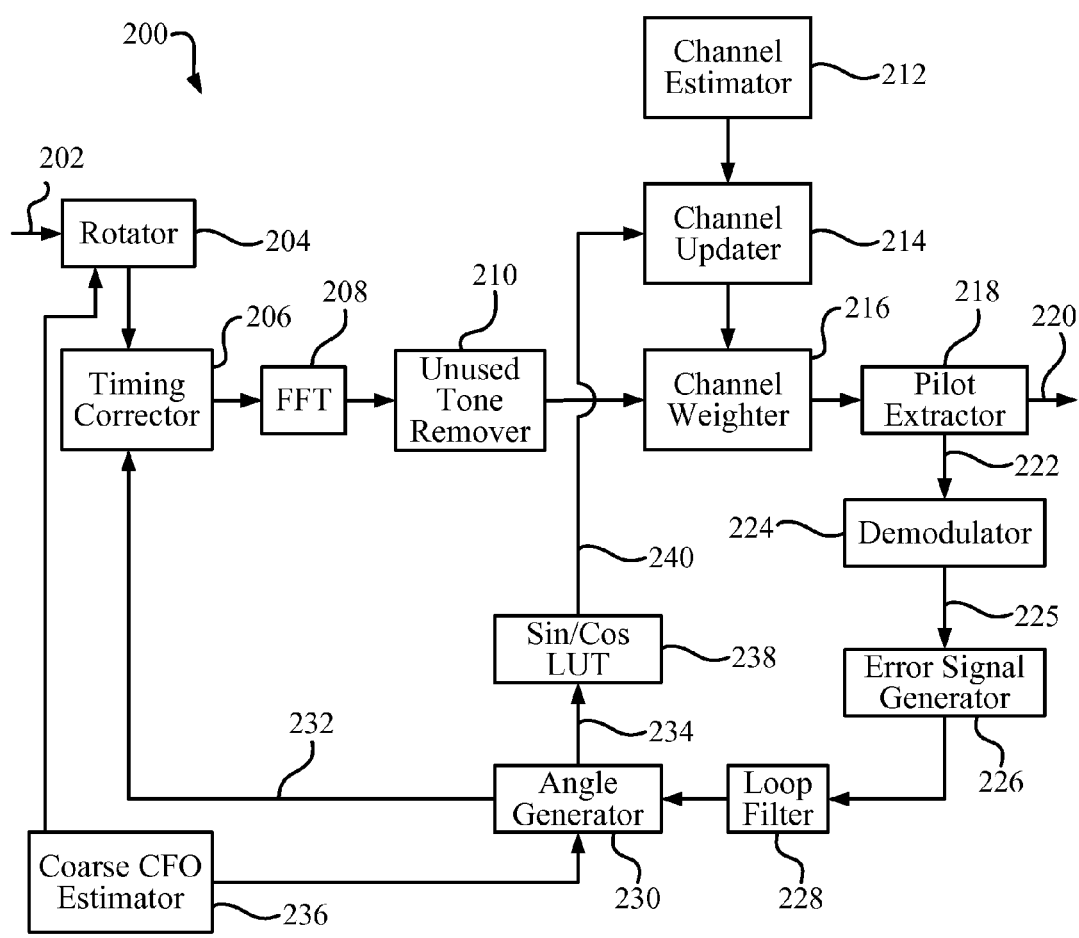
FIG. 2 is a block diagram of a system for phase tracking in the frequency domain that may be employed in a wireless communication system receiver.
Figure 3:
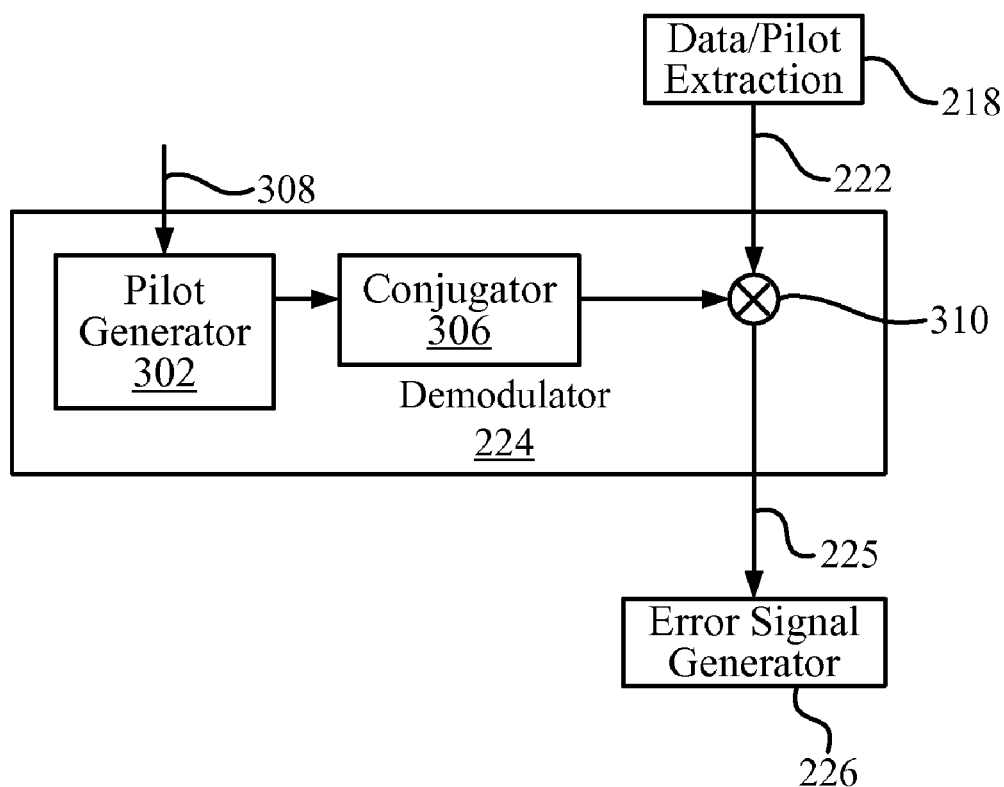
FIG. 3 is a block diagram of a demodulator of the system of FIG. 2.

In block 106, the extracted pilot tones of block 104 are demodulated. In some configurations, block 106 may be performed by a demodulator 224, as shown in FIG. 2. FIG. 3 provides a more detailed description of demodulator 224. Demodulation may include multiplying the collected pilot tones by a complex conjugate of a corresponding referent pilot. The referent pilot may be generated by a pilot generator 302 (see FIG. 3) so that the products of a multiplier 310 (see FIG. 3) have phase information that includes the phase rotation of a pilot loop signal that is due to SFO and residual CFO.

In block 108, an error signal is generated. The error signal may depend upon whether the pilot tones are located symmetrically about a DC (center frequency of the signal spectrum). In a WiMedia system, the pilot tones may be located symmetrically around the DC. In the case of symmetrically located pilot tones, block 108 may include the steps shown in block 108a, block 108b, and 108c. In block 108a, the demodulated pilot tones may be combined by being summed to remove the SFO component of the phase information. In block 108b, the arctangent of the summed demodulated pilot tones may be used to generate the error signal. In addition, in block 108c, a normalization factor may be applied to normalize the different carrier frequency effect for frequency hopping systems, for example, systems like WiMedia.

In block 108, in the case of pilot tones that are not located symmetrically around the DC, block 108 may include the steps shown in block 108d, block 108e, and 108f. In block 108d, the arctangent of each pilot tone may be taken to get the phase information of each pilot. In block 108e, the pilot tones may be combined through a linear combination of the phase information from the pilot tones which may remove the SFO component. Similarly to the case of symmetrical pilot tones and block 108c, in block 108f, a normalization factor may be applied to normalize the different carrier frequency effect for frequency hopping systems.

In block 110, the error signal of block 108 is passed through a loop filter 228 (see FIG. 2) to obtain an estimated phase rotation due to the residual CFO. In block 112, correction phases for tones, which may also be referred to as sub-carriers, may be generated by an angle generator, for example, angle generator 230 (see FIG. 2). Generating the correction phases may include the steps shown in blocks 112a, 112b, 112c, and 112d. In block 112a, a phase rotation due to the SFO for the tones of the next symbol may be computed. The phase rotation due to the SFO may be calculated using the output of a coarse CFO estimator, for example, coarse CFO estimator 236 (see FIG. 2) and the estimated phase rotation due to the residual CFO, for example, using the output of a loop filter, for example, loop filter 228 as shown in FIG. 2. In block 112b, an invert-normalization factor may be applied to the phase rotation due to the residual CFO to compensate the different carrier frequency effect for frequency hopping systems. In block 112c, the timing error due to SFO may be calculated in order to determine whether the SFO in the time domain exceeds a sample. This may be accomplished by using the computed phase rotation due to the SFO of the outer most tone, for example, the tone with an index=64 for a WiMedia system. If the phase rotation due to the SFO of the outer most tone exceeds pi ($\pi$), then a sample repeat or a sample skip process may be performed in the time domain, depending upon the direction of the SFO.

In block 112d, a correction phase for the plurality of tones may be calculated by summing the estimated phase rotation due to the residual CFO with a corresponding computed phase rotation due to SFO. When a sample repeat or a sample skip process is performed in the time domain, the phase rotation due to SFO may need to be offset by a corresponding amount to compensate the phase rotation due to the sample repeat or the sample skip process.

In block 114, the correction phases generated in block 112 are used to generate correction coefficients for a subsequent symbol, for example, the next symbol, for example an OFDM symbol, in the frequency domain. In block 116, the single symbol phase tracking method 100 terminates. Although described for illustration as beginning in block 102 and terminating in block 116, the method 100 may be run continuously and/or repetitively.

FIG. 2 shows a functional block diagram of receiver components 200, including a system for phase tracking in the frequency domain that may be employed in a wireless communication system receiver. Those having ordinary skill in the art will also recognize that FIG. 2 includes a phase correction receiver loop structure. The receiver may be incorporated into a large number of devices, including but not limited to, a mobile subscriber system, a laptop, and portable hand-held devices such as cellular phones, personal digital assistants (PDAs) or the like. An incoming signal is received on line 202, which may be, for example, a baseband or an intermediate frequency signal. The incoming signal is provided to a phase rotator 204. The phase rotator 204 may change the phase of the incoming signal 202 based on the output of the coarse CFO estimator 236. The output of phase rotator 204 is passed on to a timing corrector 206. Timing corrector 206 may repeat or skip samples of the signal received from rotator 204. The output of timing corrector 206 is provided to FFT 208 which is a fast Fourier transform. At the unused tone remover 210, unused tones are removed from the transformed samples output from the FFT 208.

Receiver components 200 also include a channel estimator 212, a channel updater 214, and a channel weighter 216. The channel updater 214 receives a channel update signal on line 240 from a sin/cos look up table (Sin/Cos LUT) 238 and a channel estimate from the channel estimator 212. A pilot extractor 218 receives a weighted symbol signal from the channel weighter 216 and provides an output signal on line 220, and the pilot loop signal on line 222. The pilot loop signal may include a plurality of pilot tones from one or more first symbols. The pilot loop signal is processed by demodulator 224 which provides the pilot phase information signal on a line 225. An error signal generator 226 then provides the error signal to the loop filter 228. The loop filter 228 provides phase rotation due to residual CFO signal to an angle generator 230. Angle generator 230 provides a sample adjustment signal on line 232, and a correction phase signal on line 234 based upon the outputs of the loop filter 228 and the coarse CFO estimator 236. The Sin/Cos look-up-table (LUT) 238 provides the channel update signal on line 240 based upon the correction phase signal. The combination of the Sin/Cos LUT 238 and channel updater 214 acts as a device for applying the correction phase signal to subsequent symbols. Other devices can alternatively be used to apply the correction phase signal to the subsequent symbols.

FIG. 3 shows a functional block diagram of the demodulator 224 of FIG. 2. Demodulator 224 includes the pilot generator 302, the conjugator 306, and a multiplier 310. Pilot generator 302 receives a data-rate information signal on line 308, in a manner know to those having ordinary skill in the art, and provides a referent pilot signal to conjugator 306. Multiplier 224 multiplies the collected pilot tones received from the pilot extractor 218 on line 222 with the complex conjugates of the corresponding referent pilots received from the conjugator 306. Demodulator provides the resulting pilot tone phase information signal that includes the phase rotation of a pilot loop signal that is due to SFO and residual CFO to the error signal generator 226 on line 225.

Signal Model

Although the appended claims are not limited to the signal model described herein, the signal model of a WiMedia ultra wide band (UWB) system is presented as an aid in understanding exemplary methods, apparatuses and articles of manufacture described herein. The signal model presented includes the effects of CFO and SFO. The WiMedia UWB system may include a transmitter (not shown) and a receiver that may include receiver components 200.

In a WiMedia UWB system, for example, the WiMedia UWB system described in the *WiMedia Multiband OFDM Physical Layer Specification Version* 1.2, published by the WiMedia Alliance, Inc., Feb. 22, 2007, a receiver local oscillator (LO) generator (not shown) and a receiver sampler, for example, an analog-to-digital converter (not shown), may be driven by a common receiver clock (not shown). As a result, the CFO and the SFO may be related and a common parameter may be estimated to compensate for the CFO and the SFO.

Those having ordinary skill in the art are familiar with systems and methods for coarse CFO estimation and correction. In the signal model, an offset in part-per-million (ppm) of the clock may be represented by $\delta$, and may consist of two parts: the first, a coarse clock offset, $\delta^c$, may be the clock offset that is known by a WiMedia UWB system receiver after coarse CFO estimation in the time domain; the second, a residual clock offset, $\delta^r$, may be the error of the coarse CFO estimation and correction. Thus, $\delta = \delta^c + \delta^r$.

In the signal model, the assumption may be made that the receiver clock is slower than the transmitter clock. A residual CFO, represented by $\Delta f^r$, may be linearly related to the residual clock offset, $\delta^r$, as $$\Delta f^r = f_c \times \delta^r \quad \text{Eq. (1)}$$

where $f_c$ represents the carrier frequency. If the receiver clock is slower than a transmitter clock, a receiver sampling period may be expressed as $$T_s' = (1+\eta)T_s \quad \text{Eq. (2)}$$

where the receiver sampling period is represented by $T_s'$; a transmitter sampling period is represented by $T_s$; and $\eta = \delta/(1-\delta)$. In the signal model, the SFO is related to the residual clock offset, $\delta^r$ and the coarse clock offset, $\delta^c$.

In the WiMedia UWB system, a zero padded suffix of duration $T_G$ seconds may be transmitted for a symbol transmitted in the WiMedia UWB system. An $i^{th}$ orthogonal frequency division multiplexing (OFDM) symbol may be represented by $$\begin{cases} x_i(t) = \frac{1}{\sqrt{N}} \sum_{k=0}^{N-1} X_{i,k} e^{\frac{j2\pi k}{NT_s}(t-(i-1)T_{SYM})}, & (i-1)T_{SYM} < t \le \\ & (i-1)T_{SYM} + T_{FFT} \\ x_i(t) = 0, & (i-1)T_{SYM} + \\ & T_{FFT} < t \le iT_{SYM} \end{cases} \quad \text{Eq. (3)}$$

where the frequency domain data symbols for the $i^{th}$ symbol on the $k^{th}$ tone may be represented by $X_{i,k}$; the symbol time may be represented by $T_{SYM} = (N+G)T_s$; $T_{FFT} = NT_s$; and $T_G = GT_s$. The transmitted signal, represented by $x(t)$, may be obtained by concatenating the symbols.

In the signal model, the received signal, in the presence of the residual CFO, may be modeled as $$y(t) = h(t) \otimes x(t) e^{j2\pi \Delta f^r t} + n(t) \quad \text{Eq. (4)}$$

where linear convolution is indicated by $\otimes$; a frequency selective channel is represented by $h(t)$; $\Delta f^r = \Delta f - \Delta f^c$ is the residual CFO after coarse CFO compensation, represented by $\Delta f^c$; a zero mean AWGN noise with variance $N_0$ is represented by $n(t)$.

A noise free received signal corresponding to the $i^{th}$ symbol may be expressed as $$y_i(t) = x_i(t) \otimes h(t) e^{j2\pi \Delta f^r t}, t \in ((i-1)T_{SYM}, iT_{SYM}] \quad \text{Eq. (5)}$$

After overlap-and-add the padded suffix, N received samples corresponding to the $i^{th}$ symbol may be represented as $y_i(nT_s' + (i-1)T_{SYM}')$ for $n = [0, 1, \ldots, N-1]$ and may be expressed as $$y_i(nT_s' + (i-1)T_{SYM}') = \frac{1}{\sqrt{N}} \sum_{k=0}^{N-1} H_k X_{i,k} e^{j \times f(k,i,T_s)} \quad \text{Eq. (6)}$$

$$e^{j \times f(k,i,T_s)} = e^{\frac{j2\pi k}{NT_s}[n(1+\eta)T_s + (i-1)N_{SYM}(1+\eta)T_s - (i-1)N_{SYM}T_s]}$$

$$e^{\frac{j2\pi\epsilon}{NT_s}[(n+(i-1)N_{SYM})(1+\eta)T_s]}$$

where $T_{SYM}' = (N+G)T_s'$; $\epsilon$ is the normalized residual CFO; $\epsilon = \Delta f^r NT_s$; (normalized to tone spacing); and $N_{SYM} = (N+G)$; and $H_k$ represents the channel frequency response at the $k^{th}$ tone.

The receiver assumes that its timing is perfect and simply takes the FFT of these samples in order to demodulate the data of the $i^{th}$ symbol as follows:

$$Y_{i,l} = \frac{1}{\sqrt{N}} \sum_{n=0}^{N-1} y_i(nT'_s + (i-1)T'_{SYM}) e^{\frac{-j2\pi ln}{N}} \quad \text{Eq. (7)}$$

$$= \frac{1}{N} \sum_{n=0}^{N-1} \sum_{k=0}^{N-1} H_k X_{i,k} e^{\frac{j2\pi k}{NT_s}[n(1+\eta)T_s + (i-1)N_{SYM}(1+\eta)T_s - (i-1)N_{SYM}T_s]}$$

$$e^{\frac{j2\pi \varepsilon}{NT_s}[(n+(i-1)N_{SYM})(1+\eta)T_s]} e^{\frac{-j2\pi ln}{N}}$$

where l is the tone index.

In the presence of noise, the demodulator outputs $Y_{i,l}$ can be decomposed in a desired term $Y_{i,l}^D$, an inter-carrier interference term (ICI) $Y_{i,l}^{ICI}$, and an AWGN noise term $N_{i,l}$, for example:

$$Y_{i,l} = Y_{i,l}^D + Y_{i,l}^{ICI} + N_{i,l} \quad \text{Eq. (8)}$$

The desired term is given by:

$$Y_{i,l}^D = \frac{1}{N} \sum_{n=0}^{N-1} H_l X_{i,l} e^{\frac{j2\pi l}{N}[n(1+\eta)+((i-1)N_{SYM})(1+\eta)-(i-1)N_{SYM}]} \quad \text{Eq. (9)}$$

$$e^{\frac{j2\pi \varepsilon}{N}(n+(i-1)N_{SYM})(1+\eta)} e^{-j2\pi \frac{ln}{N}}$$

$$= \frac{1}{N} H_l X_{i,l} \sum_{n=0}^{N-1} e^{\frac{j2\pi ln\eta}{N}} e^{\frac{j2\pi \varepsilon n(1+\eta)}{N}} e^{j\theta_{i,l}},$$

where phase factor, $\theta_{i,l}$, is a phase rotation that is growing with the symbol index, i, and dependent on the tone index, l. Phase factor, $\theta_{i,l}$, may also be expressed as:

$$\theta_{i,l} = \frac{2\pi}{N} N_{SYM}(i-1)[\varepsilon(1+\eta) + l\eta] \quad \text{Eq. (10)}$$

The desired term can also be expressed as:

$$Y_{i,l}^D = \frac{1}{N} H_l X_{i,l} e^{j\theta_{i,l}} \sum_{n=0}^{N-1} e^{\frac{j2\pi n}{N}(\varepsilon(1+\eta)+l\eta)} \quad \text{Eq. (11)}$$

$$= \frac{1}{N} H_l X_{i,l} e^{j\theta_{i,l}} \frac{1 - e^{\frac{j2\pi}{N}(\varepsilon(1+\eta)+l\eta)N}}{1 - e^{\frac{j2\pi}{N}(\varepsilon(1+\eta)+l\eta)}}$$

$$= \frac{1}{N} H_l X_{i,l} e^{j\theta_{i,l}} e^{j\frac{\pi(N-1)}{N}(\varepsilon(1+\eta)+l\eta)} \frac{\sin(\pi(\varepsilon(1+\eta)+l\eta))}{\sin\left(\frac{\pi}{N}(\varepsilon(1+\eta)+l\eta)\right)}$$

$$\approx H_l X_{i,l} e^{j\theta_{i,l}} e^{j\frac{\pi(N-1)}{N}(\varepsilon(1+\eta)+l\eta)}$$

where $\frac{\sin(x)}{\sin(x/N)} \approx N$ for $x \ll \pi$.

Channel Estimating and Weighting

Channel estimating and channel weighting may be provided by channel estimator 212 and channel weighter 216. An exemplary frequency domain channel estimation based on $N_{ce}=6$ known OFDM symbols for fixed frequency interleaving (FFI), time frequency interleaving (TFI), and time frequency interleaving 2 (TFI2) modes is now described herein. The effects of SFO and residual CFO on the frequency domain channel estimation are described and an outcome phase factor is provided in Eq. 16 (for FFI), Eq. 22 (for TFI), and Eq. 28 (for TFI2) based upon the use of the frequency domain channel estimation to weight the data symbols in a header and a payload of a frame. In this section, to simplify the calculations, $\|X_{i,l}\|^2 = 1$ for the exemplary FDCE.

Channel estimator 212 may provide a channel estimation that may be performed based on $N_{ce}=6$ known OFDM training symbols from symbol index $N_{preamble}-5$ to symbol index $N_{preamble}$.

Fixed Frequency Interleaving

In the FFI mode, the training symbols may be transmitted on the same frequency band and all training symbols may be employed to estimate the channel. Assuming an ideal receiver that has no SFO and no residual CFO, the least-square (LS) channel estimator based on $N_{CE}$ received symbols $Y_{N_{preamble}-5}$ to $Y_{N_{preamble}}$ in the frequency domain may be expressed as:

$$\hat{H}_l = \frac{1}{N_{ce}} \sum_{i=N_{preamble}-5}^{N_{preamble}} Y_{i,l} X_{i,l}^* \quad \text{Eq. (12)}$$

For FFI in the presence of SFO and residual CFO, the desired term of Eq. 11 may be expressed as:

$$\hat{H}_l^D = \frac{1}{N_{ce}} \sum_{i=N_{preamble}-5}^{N_{preamble}} Y_{i,l}^D X_{i,l}^* \quad \text{Eq. (13)}$$

$$= H_l e^{j\frac{\pi(N-1)}{N}(\varepsilon(1+\eta)+l\eta)} \frac{1}{N_{ce}} \sum_{i=N_{preamble}-5}^{N_{preamble}} e^{j\theta_{i,l}}$$

$$= H_l e^{j\frac{\pi(N-1)}{N}(\varepsilon(1+\eta)+l\eta)} e^{j\theta_{N_{preamble}-5,l}} \frac{1}{N_{ce}} \sum_{i=1}^{N_{ce}} e^{j\theta_{i,l}}$$

$$= H_l e^{j\frac{\pi(N-1)}{N}(\varepsilon(1+\eta)+l\eta)} e^{j\theta_{N_{preamble}-5,l}}$$

$$\frac{1}{N_{ce}} e^{j\frac{\pi}{N}N_{SYM}(N_{ce}-1)(\varepsilon(1+\eta)+l\eta)} \frac{\sin(N_{CE} \times \varphi)}{\sin(\varphi)} \quad \text{where}$$

$$\varphi = \frac{\pi}{N} N_{SYM}(\varepsilon(1+\eta) + l\eta)$$

Since $\phi \ll \pi$, $$\frac{1}{N_{ce}} \times \frac{\sin(N_{ce} \times \varphi)}{\sin(\varphi)} \approx 1,$$

The desired term can be approximated as:

$$\hat{H}_l^D \approx H_l e^{j\frac{\pi(N-1)}{N}(\varepsilon(1+\eta)+l\eta)} e^{j\theta_{N_{preamble}-5,l}} e^{j\frac{\pi}{N}N_{SYM}(N_{ce}-1)(\varepsilon(1+\eta)+l\eta)} \quad \text{Eq. (14)}$$

Assuming that the channel is stationary for the duration of a packet the channel weighter 216 may use the channel estimation of Eq. 12 to weight the data symbols in the header and the payload starting from symbol index $i=N_{preamble}+1$ Denoting the weighted tones as $\tilde{Y}_{i,l}=Y_{i,l}\hat{H}_l^*$ we obtain for the desired part of the weighted tones:

$$\tilde{Y}_{i,l}^D = \|H_l\|^2 X_{i,l} e^{j(\theta_{i,l} - \theta_{N_{preamble}-5,l} - \frac{\pi}{N}N_{SYM}(N_{CE}-1)(\varepsilon(1+\eta)+l\eta))} \quad \text{Eq. (15)}$$
$$= \|H_l\|^2 X_{i,l} e^{j\tilde{\theta}_{i,l}}$$

The weighted tones contain a phase factor that is growing with the symbol index and is dependent on the tone index l. The phase factor of the weighted tones for FFI may be expressed as:

$$\tilde{\theta}_{i,l} = \theta_{i,l} - \theta_{N_{preamble}-5,l} - \frac{\pi}{N}N_{SYM}(N_{CE}-1)(\varepsilon(1+\eta)+l\eta) \quad \text{Eq. (16)}$$
$$= \frac{2\pi}{N}N_{SYM}(i-1-(N_{preamble}-6)-(N_{CE}-1)/2)$$
$$(\varepsilon(1+\eta)+l\eta)$$
$$= \frac{2\pi}{N}N_{SYM}(i-(N_{preamble}-5)-(N_{CE}-1)/2)$$
$$(\varepsilon(1+\eta)+l\eta)$$

Time Frequency Interleaving

For the case of TFI, the training symbols may be transmitted over different frequency bands. For example, the training symbols may be transmitted over three frequency bands. The different frequency bands may experience different channels. For estimation of a channel in a particular band, only $N_{ce}/3=2$ training symbols may be available. Described below are channel estimations for a time frequency code 1 (TFC1)=[1 2 3 1 2 3] of a TFI mode. The channel estimation may also be generalized for other time frequency codes. For TFC1, the desired term in expression Eq. 11 may be expressed as:

$$Y_{i,l}^D = H_{b,l} X_{i,l} e^{j\theta_{i,l}} e^{j\frac{\pi(N-1)}{N}(\varepsilon_b(1+\eta)+l\eta)} \quad \text{Eq. (17)}$$

where $H_{b,l}$ is the channel response of the $l^{th}$ tone of the $b^{th}$ band; b=1, 2, 3; and $\varepsilon_b = f_{c,b}\delta'NT_s$, and $f_{c,b}$ is the carrier frequency of the $b^{th}$ band. For TFC1, the band index is related to the symbol index as b=mod(i−1,3)+1.

For TFI, the tone dependent phase factor $\theta_{i,l}$ may be expressed as:

$$\theta_{i,l} = \frac{2\pi}{N}N_{SYM}(i-1)[\varepsilon_b(1+\eta)+l\eta] \quad \text{Eq. (18)}$$

The channel estimation for band b, b=1, 2, 3, may be expressed as:

$$\hat{H}_{b,l} = \frac{1}{2}(R_{N_{preamble}-6+b,l} + R_{N_{preamble}-3+b,l}), \text{ where} \quad \text{Eq. (19)}$$
$$R_{i,l} = Y_{i,l} X_{i,l}^*$$

For TFI in the presence of SFO and residual CFO, the desired term of the above averaging operation of Eq. 19 may be written as:

$$\hat{H}_{b,l}^D = \frac{1}{2}(R_{N_{preamble}-6+b,l}^D + R_{N_{preamble}-3+b,l}^D) \quad \text{Eq. (20)}$$
$$= H_{b,l} e^{j\frac{\pi(N-1)}{N}(\varepsilon_b(1+\eta)+l\eta)}$$
$$e^{j\frac{2\pi}{N}N_{SYM}(N_{preamble}-5.5+b)(\varepsilon_b(1+\eta)+l\eta)}\cos(\varphi)$$

where $$\varphi = 3\frac{\pi}{N}N_{SYM}(\varepsilon_b(1+\eta)+l\eta) << \pi$$
$$\hat{H}_{b,l}^D \approx H_{b,l} e^{j\frac{\pi(N-1)}{N}(\varepsilon_b(1+\eta)+l\eta)} e^{j\frac{2\pi}{N}N_{SYM}(N_{preamble}-5.5+b)(\varepsilon_b(1+\eta)+l\eta)}$$

The desired part of the weighted tones $\tilde{Y}_{i,l}=Y_{i,l}(\hat{H}_{b,l})^*$ for TFI may be written as:

$$\tilde{Y}_{i,l}^D = \|H_{b,l}\|^2 X_{i,l} e^{j(\theta_{i,l} - \frac{2\pi}{N}N_{SYM}(N_{preamble}-5.5-b)(\varepsilon_b(1-\eta)+l\eta))} \quad \text{Eq. (21)}$$
$$= \|H_{b,l}\|^2 X_{i,l} e^{j\tilde{\theta}_{i,l}}$$

The phase factor of the weighted tones for TFI may be written as:

$$\tilde{\theta}_{ij} = \left\{\theta_{i,l} - \frac{2\pi}{N}N_{SYM}(N_{preamble}-5.5+b)(\varepsilon_b(1+\eta)+l\eta)\right\} \quad \text{Eq. (22)}$$
$$= \frac{2\pi}{N}N_{SYM}[i-(N_{preamble}-4.5)-b](\varepsilon_b(1+\eta)+l\eta)$$

Time Frequency Interleaving 2

For the case of TFI2, the training symbols may be transmitted over different frequency bands as in TFI. For example, in TFI2 the training symbols may be transmitted over two frequency bands. The different frequency bands may experience different channels. For estimation of a channel in a particular band, only $N_{ce}/2=3$ training symbols may be available. Described below are channel estimations for a time frequency code 8 (TFC8)=[1 2 1 2 1 2] of the TFI2 mode. The channel estimation may also be generalized for other time frequency codes. For TFC8, the desired term in expression Eq. 11 above may be expressed as:

$$Y_{i,j}^D = H_{b,l} X_{i,l} e^{j\theta_{i,l}} e^{j\frac{\pi(N-1)}{N}(\varepsilon_b(1-\eta)+l\eta)} \quad \text{Eq. (23)}$$

For TFI2, the tone dependent phase factor $\theta_{i,l}$ may be expressed as:

$$\theta_{i,l} = \frac{2\pi}{N}N_{SYM}(i-1)[\varepsilon_b(1+\eta)+l\eta] \quad \text{Eq. (24)}$$

For TFC8, the band index is related to the symbol index as b=mod(i−1,2)+1. The channel estimation for band b, b=1, 2 may be expressed as:

$$\hat{H}_{b,l} = \frac{1}{3}(R_{N_{preamble}-6+b,l} + R_{N_{preamble}-4+b,l} + R_{N_{preamble}-2+b,l}), \quad \text{Eq. (25)}$$

where $$R_{i,l} = Y_{i,l} X_{i,l}^*$$

For TFI2 in the presence of SFO and residual CFO, the desired term of the above averaging operation of Eq. 25 may be expressed as:

$$\hat{H}_{b,l}^D = \frac{1}{3}\left(R_{N_{preamble}-6+b,l}^D + R_{N_{preamble}-4+b,l}^D + R_{N_{preamble}-2+b,l}^D\right) \quad \text{Eq. (26)}$$

$$= \frac{1}{3} H_{b,l} e^{j\frac{\pi(N-1)}{N}(\varepsilon_b(1+\eta)+l\eta)}$$

$$e^{j\frac{2\pi}{N}N_{SYM}(N_{preamble}-5+b)(\varepsilon_b(1+\eta)+l\eta)} \frac{\sin(\varphi)}{\sin(\varphi/3)}$$

where $$\varphi = 3\frac{2\pi}{N}N_{SYM}(\varepsilon_b(1+\eta)+l\eta) << \pi$$

$$\hat{H}_{b,l}^D \approx$$

$$H_{b,l} e^{j\frac{\pi(N-1)}{N}(\varepsilon_b(1+\eta)+l\eta)} e^{j\frac{\pi(N-1)}{N}(\varepsilon_b(1+\eta)+l\eta)} e^{j\frac{2\pi}{N}N_{SYM}(N_{preamble}-5+b)(\varepsilon_b(1+\eta)+l\eta)}$$

The desired part of the weighted tones $\tilde{Y}_{i,l} = Y_{i,l}(\hat{H}_{b,l})^*$ for TFI2 may be expressed as:

$$\tilde{Y}_{i,l}^D = \|H_{b,l}\|^2 X_{i,l} e^{j(\theta_{i,l} - \frac{2\pi}{N}N_{SYM}(N_{preamble}-5+b)(\varepsilon_b(1+\eta)+l\eta))} \quad \text{Eq. (27)}$$

$$= \|H_{b,l}\|^2 X_{i,l} e^{j\tilde{\theta}_{i,l}}$$

The phase factor of the weighted tones for TFI2 may be expressed as:

$$\tilde{\theta}_{i,l} = \left(\theta_{i,l} - \frac{2\pi}{N}N_{SYM}(N_{preamble} - 5 + b)(\varepsilon_b(1+\eta)+l\eta)\right) \quad \text{Eq. (28)}$$

$$= \frac{2\pi}{N}N_{SYM}[i - (N_{preamble} - 4) - b](\varepsilon_b(1+\eta)+l\eta)$$

Phase Tracking

The exemplary single symbol phase tracking method 100 is further described herein. The phase tracking method 100 may compensate for a phase factor in a wireless communication system, for example, the phase factors described in Eq. 16 (for FFI), Eq. 22 (for TFI), and Eq. 28 (for TFI2). In the method 100, the tone indices take the values corresponding to pilot tones, for example $N_P=12$ pilot tones, where the data modulation is known and the modulation can be removed, for example, by demodulator 224, according to blocks 104 and 106.

Fixed Frequency Interleaving

For FFI, a description of the phase tracking method 100 is provided by expanding upon the expression for the phase factor in the weighted tones for FFI as provided in Eq. 16. From Eq. 16, the phase factor for the weighted tones for FFI for the $l^{th}$ tone of $i^{th}$ symbol may be expressed as:

$$\tilde{\theta}_{i,l} = \frac{2\pi}{N}N_{SYM}(i - (N_{preamble}-5) - (N_{CE}-1)/2)[\varepsilon(1+\eta)+l\eta] = \quad \text{Eq. (29)}$$

$$\kappa(i - (N_{preamble}-5) - (N_{CE}-1)/2)[\varepsilon(1+\eta)+l\eta] \text{ where } \kappa =$$

$$\frac{2\pi}{N}N_{SYM}$$

In Eq. 29, the effective residual CFO due to the presence of SFO is given by $\varepsilon_{eff} = \varepsilon(1+\eta)$. The FFI phase factor may be expressed as:

$$\tilde{\theta}_{i,l} = \kappa(i - (N_{preamble}-5) - (N_{CE}-1)/2)[\varepsilon_{eff}+l\eta] \quad \text{Eq. (30)}$$

$$= \phi_i + \kappa(i - (N_{preamble}-5) - (N_{CE}-1)/2)l\eta \text{ where}$$

$$\phi_i = \kappa(i - (N_{preamble}-5) - (N_{CE}-1)/2)\varepsilon_{eff}$$

An exemplary method for estimating the phase rotation of the $i^{th}$ symbol due to residual CFO, $\phi_i$, based on the received weighted symbol $\tilde{Y}_i$ is now described. The estimate of $\phi_i$ may then used to calculate $\eta$, and the phase factor for the weighted tones, $\tilde{\theta}_{i,l}$. For WiMedia communications systems, there are 12 pilot tones in an OFDM symbol. The indices of pilot tones may be represented as $l \in [-55, -45, -35, -25, -15, -5, 5, 15, 25, 35, 45, 55]$. After removing the modulation, for example, using demodulator 224 and/or according to block 106, the desired part of the weighted pilot tones after removing modulation can be expressed as:

$$\tilde{Y}_{rm,i,l}^D = \|H_l\|^2 \|P\|^2 e^{j[\phi_i+\kappa(i-(N_{preamble}-5)-(N_{CE}-1)/2)l\eta]} \quad \text{Eq. (31)}$$

Because of the symmetric location of pilot tones, summing up the twelve pilot tones, for example, by using summing the pilot tones according to block 108a, will remove the SFO component, leaving the summation output as follows:

$$\sum_l \tilde{Y}_{rm,i,l}^D = \|P\|^2 e^{j\phi_i} \sum_l \|H_l\|^2 e^{j\kappa(i-(N_{preamble}-5)-(N_{CE}-1)/2)l\eta} \quad \text{Eq. (32)}$$

$$\approx \|P\|^2 e^{j\phi_i} \sum_{l>0} \|H_l\|^2$$

$$2\cos(\kappa(i - (N_{preamble}-5) - (N_{CE}-1)/2)l\eta)$$

The approximation in Eq. 32 will become an equality in AWGN. The estimate of the phase rotation of the $i^{th}$ symbol due to residual CFO, $\phi_i$, based on the received weighted symbol $\tilde{Y}_i$ for the open loop solution may be expressed as:

$$\hat{\phi}_i = \tan^{-1}\left(\frac{\text{Im}\left(\sum_l \tilde{Y}_{rm,i,l}\right)}{\text{Re}\left(\sum_l \tilde{Y}_{rm,i,l}\right)}\right) \quad \text{Eq. (33)}$$

The phase rotation of the $l^{th}$ tone of the $i^{th}$ symbol due to SFO may be expressed as:

$$\kappa(i - (N_{preamble}-5) - (N_{CE}-1)/2)l\hat{\eta}_i = \quad \text{Eq. (34)}$$

$$\kappa(i - (N_{preamble}-5) - (N_{CE}-1)/2)l\frac{\hat{\delta}_i}{1-\hat{\delta}_i} \approx$$

$$\kappa(i - (N_{preamble}-5) - (N_{CE}-1)/2)l\hat{\delta}_i =$$

$$\kappa(i - (N_{preamble}-5) - (N_{CE}-1)/2)l(\delta^c + \hat{\delta}_i^r)$$

The approximation in Eq. 34 assumes that $1 >>>> \eta$. The coarse clock offset $\delta^c$ may be derived from the coarse CFO estimation in time domain, which may be provided, for example, by coarse CFO estimator 236. The estimated residual clock offset for the tone index, $\hat{\delta}_i^r$, may be expressed as:

$$\hat{\delta}_i^r = \frac{\hat{\varepsilon}_{eff}}{(1+\eta)f_c NT_s}$$

$$= \frac{\hat{\phi}_i}{(1+\eta)f_c NT_s \kappa(i-(N_{preamble}-5)-(N_{CE}-1)/2)}$$

$$\approx \frac{\hat{\phi}_i}{f_c NT_s \kappa(i-(N_{preamble}-5)-(N_{CE}-1)/2)}$$

Eq. (35)

The approximation in Eq. 35 assumes that $1 \gg \eta$. The estimated phase factor of the weighted tones may be expressed as:

$$\hat{\theta}_{i,j} = \hat{\phi}_i + l\frac{\hat{\phi}_i}{f_c NT_s} + \kappa(i-(N_{preamble}-5)-(N_{CE}-1)/2)l\delta^c$$

Eq. (36)

In Eq. 33, the estimated phase rotation due to the residual CFO must be less than pi ($\pi$), $\hat{\phi}_i < \pi$, to avoid ambiguity. This potential ambiguity would eventually be violated due to the linear increasing of the symbol index. The potential ambiguity may be addressed by using several block representations to model a receiver loop structure and components as provided in FIG. 4, FIG. 5, and FIG. 6.

Figure 4:
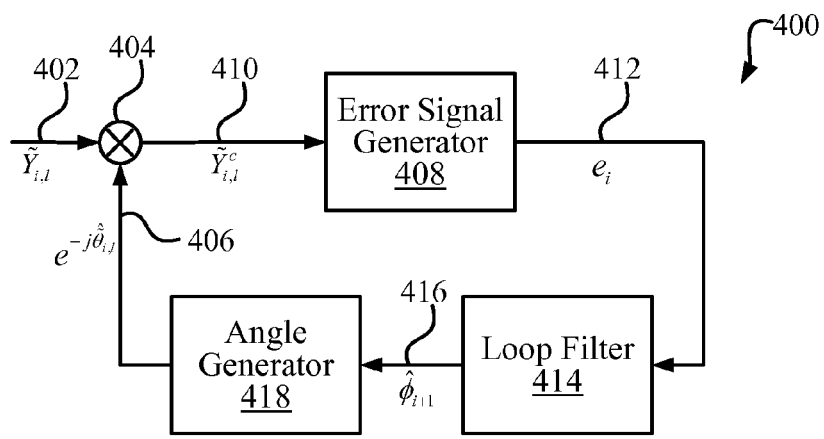
FIG. 4 is a block diagram of a phase correction receiver loop structure for describing the method of FIG. 1 and the system of FIG. 2.

FIG. 4 shows a phase correction receiver loop structure 400, which is a model of a phase correction receiver loop structure shown in FIG. 2, to track and correct the phase rotation due to SFO and residual CFO. In FIG. 4, a received weighted tone, $\tilde{Y}_{i,l}$, is provided to multiplier 404 on line 402. After being multiplied with a phase correction signal, $$e^{-j\hat{\theta}_{i,l}},$$

from line 406, a corrected weighted received tone $\tilde{Y}_{i,l}^c$ is provided to an error signal generator 408 on line 410. The error signal generator 408 provides an error signal for the loop, $e_i$, on line 412 to loop filter 414. Loop filter 414 provides an estimated phase rotation of the $(i+1)^{th}$ symbol due to residual CFO signal, $\hat{\phi}_{i+1}$, on line 416 to angle generator 418.

The corrected weighted received tone $\tilde{Y}_{i,l}^c$ on line 410 may be expressed as:

$$\tilde{Y}_{i,l}^c = \tilde{Y}_{i,l} e^{-j\hat{\theta}_{i,l}}$$

Eq. (37)

where the estimated phase factor of the weighted tones, $\hat{\theta}_{i,l}$, may be expressed as:

$$\hat{\theta}_{i,l} = \hat{\phi}_i + \kappa(i-(N_{sync}-5)-(N_{CE}-1)/2)l\hat{\eta}_i$$

$$= \hat{\phi}_i + l\frac{\hat{\phi}_i}{f_c NT_s} + \kappa(i-(N_{preamble}-5)-(N_{CE}-1)/2)l\delta^c$$

Eq. (38)

The updated channel estimation of the $l^{th}$ tone of the $i^{th}$ symbol can also be defined as $$\hat{H}_{i,l} = \hat{H}_l e^{-j\hat{\theta}_{i,l}}.$$

The updated channel estimation, $$\hat{H}_{i,l} = \hat{H}_l e^{-j\hat{\theta}_{i,l}},$$

may then be used to weight the received $l^{th}$ tone of $i^{th}$ symbol, $Y_{i,l}$. Thereby, generating the corrected weighted received tones which may be expressed as:

$$\hat{Y}_{i,l}^c = \hat{H}_{i,l} Y_{i,l}$$

Eq. (39)

where the corrected tones after removing modulation is denoted $\tilde{Y}_{rm,i,l}^c$, the error signal generator 408 may then generate an FFI error signal for the loop $e_i$ on line 412 as:

$$e_i = \tan^{-1}\left(\frac{\text{Im}\left(\sum_l \tilde{Y}_{rm,i,l}^c\right)}{\text{Re}\left(\sum_l \tilde{Y}_{rm,i,l}^c\right)}\right)$$

Eq. (40)

which is input to loop filter 414.

Figure 5:
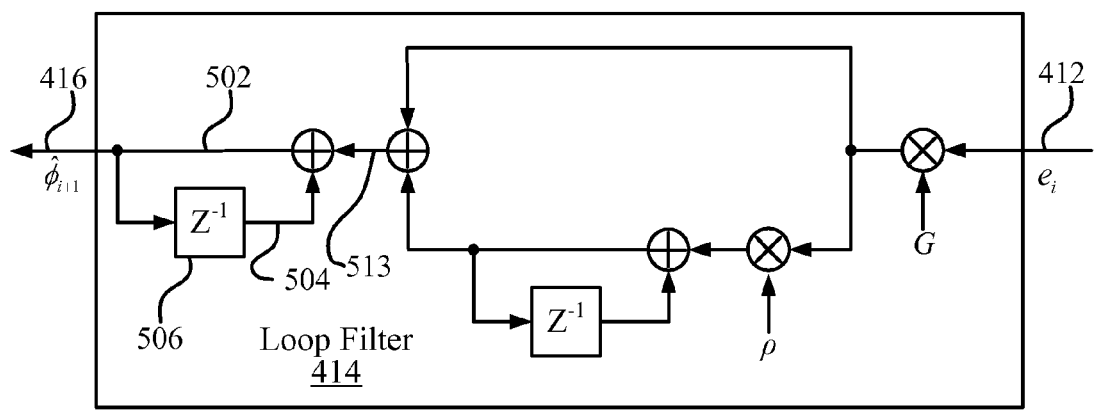
FIG. 5 is a block diagram of the loop filter of FIG. 4.
Figure 6:
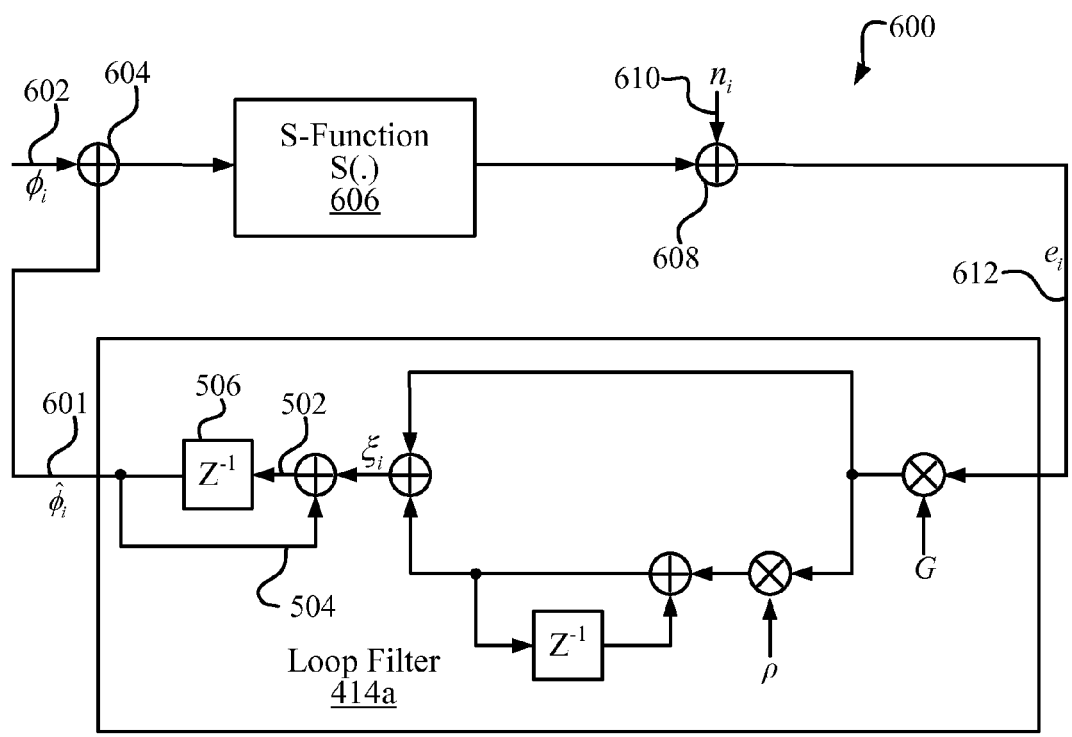
FIG. 6 is a block diagram of an equivalent model of a second-order phase correction receiver loop structure for describing the method of FIG. 1 and the system of FIG. 2.

FIG. 5 shows a block diagram of loop filter 414 of FIG. 4 that includes a feed forward branch 502 that includes a memory element 506, and a feedback branch 504. The output of loop filter 414 may be input to angle generator 418 to generate the phase correction signal, $$e^{-j\hat{\theta}_{i+1,l}},$$

on line 406 for the subsequent incoming received weighted tone, $\tilde{Y}_{i+1,l}$, received on line 402. FIG. 6 shows an equivalent model 600 of the phase correction receiver loop structure 400 shown in FIG. 4 for theoretical analysis, including a loop filter 414a and an S-function 606. In the equivalent loop model 600, memory element 506 of the last stage of loop filter 414 has been moved from feedback branch 504 to feed forward branch 502 to mimic that information from a current, for example, a first symbol, may be used to estimate the correction for the subsequent symbol, for example, the next symbol.

Eq. 37 may be used to calculate the corrected weighted received tone $\tilde{Y}_{i,l}^c$ i for the noise free case, which may also be considered as deriving the S-curve, as:

$$\tilde{Y}_{i,l}^c = \|H_l\|^2 X_{i,l} e^{j\hat{\theta}_{i,l}} e^{-j\hat{\theta}_{i,l}}$$

$$= \|H_l\|^2 X_{i,l} e^{j[(\phi_i-\hat{\phi}_i)+\kappa(i-(N_{preamble}-5)-(N_{CE}-1)/2)l(\eta-\hat{\eta}_i)]}$$

Eq. (41)

For twelve pilot tones, after removing modulation and summing, the result may be expressed as:

$$\sum_l \tilde{Y}^c_{rm,i,l} = \|P\|^2 e^{j(\phi_i - \hat{\phi}_i)} \sum_l \|H_l\|^2 \quad \text{Eq. (42)}$$
$$e^{j\kappa(i-(N_{preamble}-5)-(N_{CE}-1)/2)l(\eta-\hat{\eta}_i)}$$
$$\approx \|P\|^2 e^{j(\phi_i - \hat{\phi}_i)} \sum_{l>0} \|H_l\|^2 2\cos(\kappa(i-(N_{preamble}-5)-$$
$$(N_{CE}-1)/2)l(\eta-\hat{\eta}_{i-1}))$$

where $$\tan^{-1}\left(\frac{\text{Im}\left(\sum_l \tilde{Y}^c_{rm,i,l}\right)}{\text{Re}\left(\sum_l \tilde{Y}^c_{rm,i,l}\right)}\right) = (\phi_i - \hat{\phi}_i),$$

and the S-function 606 in the equivalent model 600 may be expressed as:

$$S(\phi_i - \hat{\phi}_i) = \phi_i - \hat{\phi}_i \quad \text{Eq. (43)}$$

The estimation error is defined as $f_i = \phi_i - \hat{\phi}_i$. The transfer function of the estimation error, $f_i$, with respect to the noise, $n_i$, may be expressed as:

$$H(Z) = \frac{F(Z)}{N(Z)} = \frac{A(Z)}{1+A(Z)}; \quad \text{where} \quad \text{Eq. (44)}$$
$$A(Z) = \frac{G(1+\rho)Z - G}{(Z-1)^2}$$
$$H(Z) = \frac{G(1+\rho)Z - G}{(Z-1)^2 + G(1+\rho)Z - G}$$

The noise equivalent bandwidth, $B_L$, the damping factor, $\zeta$, and the natural frequency, $\omega_n$, may be calculated as:

$$B_L = \frac{2\rho + G(2+\rho)}{2[4 - G(2+\rho)]} \times \frac{1}{T} \quad \text{Eq. (45)}$$
$$\zeta = \frac{(1+\rho)\sqrt{G}}{2\sqrt{\rho}}$$
$$\omega_n = \sqrt{\rho G} \times \frac{1}{T}$$

where $1/T$ is the update rate of the loop.

Time Frequency Interleaving

For TFI, a description of the phase tracking method is provided by expanding upon the expression for the phase factor in the weighted tones for TFI as provided in Eq. 22. From Eq. 22, the TFI tone dependent phase factor for the $l^{th}$ tone of $i^{th}$ symbol may be written as:

$$\hat{\theta}_{i,l} = \frac{2\pi}{N} N_{SYM}[i-(N_{preamble}-4.5)-b](\varepsilon_b(1+\eta)+l\eta) \quad \text{Eq. (46)}$$
$$= \kappa[i-(N_{preamble}-4.5)-b](\varepsilon_{eff,b}+l\eta)$$
$$= \phi_{b,i} + \kappa[i-(N_{preamble}-4.5)-b]l\eta \quad \text{where}$$
$$\phi_{b,i} = \kappa[i-(N_{preamble}-4.5)-b]\varepsilon_{eff,b}$$

An algorithm for tracking the phase rotation of the $i^{th}$ symbol for band b due to residual CFO, $\phi_{b,i}$, for TFI may be developed using comparable steps to that for FFI. However, it may be beneficial to avoid using three loops to track for the three bands. Instead, the phase rotation of the $i^{th}$ symbol for band b due to residual CFO, $\phi_{b,i}$, of each band may be normalized to a common parameter which may allow for tracking of one loop that includes the common parameter. The phase rotation of the $i^{th}$ symbol for band b due to residual CFO, $\phi_{b,i}$, for the three bands may be expressed as:

$$\begin{cases} \phi_{1,i} = \kappa[i-(N_{preamble}-4.5)-1] \\ \varepsilon_{eff,1} = \kappa[i-(N_{preamble}-4.5)-1]f_{c,1}\delta^r NT_s(1+\eta) \\ \phi_{2,i+1} = \kappa[i-(N_{preamble}-4.5)-1] \\ \varepsilon_{eff,2} = \kappa[i-(N_{preamble}-4.5)-1]f_{c,2}\delta^r NT_s(1+\eta) \\ \phi_{3,i+2} = \kappa[i-(N_{preamble}-4.5)-1] \\ \varepsilon_{eff,3} = \kappa[i-(N_{preamble}-4.5)-1]f_{c,3}\delta^r NT_s(1+\eta) \end{cases} \quad \text{Eq. (47)}$$

Where $\phi_i = 1 \times \phi_{1,i}$, then $$\phi_i = \frac{f_{c,1}}{f_{c,2}}\phi_{2,i+1} \quad \text{and} \quad \phi_i = \frac{f_{c,1}}{f_{c,3}}\phi_{3,i+2},$$

and the phase rotation of the symbol due to the residual CFO, $\phi_i$, is the common parameter for tracking in a loop. Normalization factors may be defined as:

$$\begin{cases} c_1 = 1 \\ c_2 = \frac{f_{c,1}}{f_{c,2}} \\ c_3 = \frac{f_{c,1}}{f_{c,3}} \end{cases} \quad \text{Eq. (48)}$$

The error signal generator 408 may then generate a TFI error signal for the loop $e_i$ on line 412 as:

$$e_i = c_b \tan^{-1}\left(\frac{\text{Im}\left(\sum_l \tilde{Y}^c_{rm,i,l}\right)}{\text{Re}\left(\sum_l \tilde{Y}^c_{rm,i,l}\right)}\right) \quad \text{Eq. (49)}$$

The estimated tone dependent phase factor for the $i^{th}$ TFI symbol may be expressed as:

$$\hat{\hat{\theta}}_{i,l} = \frac{1}{c_b}\hat{\phi}_i + l\frac{\hat{\phi}_i}{f_{c,1}NT_s} + \kappa(i-(N_{preamble}-4.5)-b)l\delta^c \quad \text{Eq. (50)}$$

Time Frequency Interleaving 2

For TFI2, normalization factors may be defined as:

$$\begin{cases} c_1 = 1 \\ c_2 = \frac{f_{c,1}}{f_{c,2}} \end{cases} \quad \text{Eq. (51)}$$

The estimated tone dependent phase factor for the $i^{th\text{-}}$ TFI2 symbol may be expressed as:

$$\bar{\theta}_{i,l} = \frac{1}{c_b}\hat{\phi}_i + l\frac{\hat{\phi}_i}{f_{c,1}NT_s} + \kappa(i - (N_{preamble} - 4) - b)l\delta^c \quad \text{Eq. (52)}$$

Phase Tracking for Multiple Symbols

Exemplary phase tracking methods for multiple symbols are described herein. More than one symbol may be used to generate an estimation of the phase factor, $\theta_{i,l}$, in order to decrease the power consumption required to update the loop and the channel. For example, in the phase tracking method for multiple symbols the phase rotation due to residual CFO signal, $\phi_i$, may be based on $N_{acc}$ symbols for each iteration, i.e. $[i,i+N_{acc}-1]$, starting from symbol $i=N_{preamble}+1$ (the first header symbol).

Since TFC codes may be constructed based on a block of six symbols, $N_{acc}$ may be a multiple of six to allow averaging over the three bands. In one configuration, $N_{acc}=6$ is used to provide a favorable compromise between averaging, response time of estimation, and the error due to single estimation applied for $N_{acc}$ symbols. For the first $N_{acc}$ symbols of the header, there may be no correction from phase tracker. FIG. 7A shows a table 700 indicating the rotation that the first 6 symbols of the header will be rotated for a given residual CFO, $\Delta f'$, assuming a worst case of the offset of the clock $\delta=40$ ppm. The rotations for TFI and TFI2 are of the same order as shown for FFI in the table of FIG. 7. From the data provided in Table 700, the residual CFO shall be less than 10 kHz for the multiple-symbol solution with $N_{acc}=6$.

Fixed Frequency Interleaving

In an exemplary phase tracking method for multiple symbols for FFI, after removing the modulation the 12 pilot tones may be summed and then averaged over the $N_{acc}$ symbols. The approximated desired part of the averaging results of symbols $[i,i+N_{acc}-1]$ may be expressed as:

$$\bar{\tilde{Y}}^D_{rm,i} = \frac{1}{N_{acc}} \sum_{m=i}^{i+N_{acc}-1} \sum_l \tilde{Y}^D_{rm,m} \quad \text{Eq. (53)}$$

$$= \|P\|^2 \sum_{m=i}^{i+N_{acc}-1} \sum_l \|H_l\|^2$$
$$e^{j\kappa(m-(N_{preamble}-5)-(N_{CE}-1)/2)(\varepsilon_{eff}+l\eta)}$$

$$= \frac{1}{N_{acc}}\|P\|^2 \sum_l \|H_l\|^2$$
$$\sum_{m=i}^{i+N_{acc}-1} e^{j\kappa(m-(N_{preamble}-5)-(N_{CE}-1)/2)(\varepsilon_{eff}+l\eta)}$$

$$= \frac{1}{N_{acc}}\|P\|^2 \sum_l \|H_l\|^2$$
$$e^{j\kappa(i-(N_{preamble}-5)-(N_{CE}-1)/2)(\varepsilon_{eff}+l\eta)} e^{j\kappa((N_{acc}-1)/2)(\varepsilon_{eff}+l\eta)} \frac{\sin(\varphi)}{\sin\left(\frac{\varphi}{N_{acc}}\right)}$$

$$= \frac{1}{N_{acc}}\|P\|^2 \sum_l \|H_l\|^2$$
$$e^{j\kappa(i-(N_{preamble}-5)+(N_{acc}-1)/2-(N_{CE}-1)/2)(\varepsilon_{eff}+l\eta)} \frac{\sin(\varphi)}{\sin\left(\frac{\varphi}{N_{acc}}\right)}$$

where $\varphi = \kappa(N_{acc}/2)(\varepsilon_{eff}+l\eta)$ $$\bar{\tilde{Y}}^D_{rm,i} \approx \|P\|^2 \sum_l \|H_l\|^2 e^{j\kappa\left(\frac{i-(N_{preamble}-5)+}{(N_{acc}-1)/2-(N_{CE}-1)/2}\right)(\varepsilon_{eff}+l\eta)}$$

$$\bar{\tilde{Y}}^D_{rm,i} = \|P\|^2 \sum_l \|H_l\|^2 e^{j\kappa(i-(N_{preamble}-5))(\varepsilon_{eff}+l\eta)} \quad \text{for}$$

$N_{acc} = 6$ where
$\varphi \ll \pi.$

The result of Eq. 53 may also be expressed as:

$$\bar{\tilde{Y}}^D_{rm,i} = \|P\|^2 \sum_l \|H_l\|^2 e^{j\kappa(i-(N_{preamble}-5))(\varepsilon_{eff}+l\eta)}$$

$$= \|P\|^2 e^{j\kappa(i-(N_{preamble}-5))\varepsilon_{eff}} \sum_l \|H_l\|^2 e^{j\kappa(i-(N_{sync}-5))l\eta}$$

$$\approx \|P\|^2 e^{j\kappa(i-(N_{preamble}-5))\varepsilon_{eff}} \sum_{l>0} \|H_l\|^2 2\cos$$
$$(\kappa(i-(N_{preamble}-5))l\eta)$$

$$= \|P\|^2 e^{j\phi_i} \sum_{l>0} \|H_l\|^2 2\cos(\kappa(i-(N_{preamble}-5))l\eta)$$

where $\phi_i = \kappa(i-(N_{preamble}-5))\varepsilon_{eff}$

The approximation of Eq. 54 becomes an equality in AWGN, and $\phi_i$ can be estimated as:

$$\hat{\phi}_i = \tan^{-1}\left(\frac{\text{Im}(\bar{\tilde{Y}}_{rm,i})}{\text{Re}(\bar{\tilde{Y}}_{rm,i})}\right) \quad \text{Eq. (55)}$$

The loop structure shown in FIG. 2, FIG. 4, and FIG. 6 may be used to track $\phi_i$. Since i for the loop starts from $(N_{preamble}+1)$ (first symbol of the header) and the loop estimates the phase every $N_{acc}=6$ symbols, i can be normalized to start from 0, and let $k=\lfloor i/6 \rfloor \times 6$. The estimated phase factor now can by written as:

$$\hat{\theta}_{k,l} = \hat{\phi}_k + l\frac{\hat{\phi}_k}{f_c NT_s} + \kappa(k+6)l\delta^c \quad \text{Eq. (56)}$$

For symbols $i \in [k,k+5]$, the corrected weighted received tones $\tilde{Y}^c_{i,l}$ for FFI may be expressed as:

$$\tilde{Y}^c_{i,l} = \tilde{Y}_{i,l} e^{-j\hat{\theta}_{k,l}} \quad \text{Eq. (57)}$$

The error signal entering the loop filter for FFI may be expressed as:

$$e_k = \tan^{-1}\left(\frac{\text{Im}\left(\sum_{i=k}^{k+5}\sum_l \tilde{Y}^c_{rm,i,l}\right)}{\text{Re}\left(\sum_{i=k}^{k+5}\sum_l \tilde{Y}^c_{rm,i,l}\right)}\right) \quad \text{Eq. (58)}$$

Where one estimation is used to correct for six symbols, as described in this exemplary embodiment, table 702 shown in FIG. 7B may provide the phase error.

For the worst error, of $\theta_{e,i}=2.5\kappa(\varepsilon_{\mathit{eff}}+l\eta)$, from table 702, table 703 of FIG. 7C shows the error for different residual CFOs assuming a worst case of the offset of the clock $\delta=40$ ppm. From the data provided in Tables 701 and 702, the residual CFO may be less than 10 kHz for the multiple-symbol solution with $N_{acc}=6$.

Time Frequency Interleaving

In an exemplary phase tracking method for multiple symbols for TFI, with $N_{acc}=6$ symbols, each band has 1 pair of symbols. For each band, the twelve pilot tones of a symbol may be summed first, and then averaged over two symbols. The approximated desired part of the averaging results of symbols [i,i+5] of band b (b=1, 2, 3) may be expressed as:

$$\bar{Y}_{rm,i,b}^D = \frac{1}{2}\left(\sum_l \tilde{Y}_{rm,i+b-1,l}^D + \sum_l \tilde{Y}_{rm,i+2+b-1,l}^D\right)$$

$$= \frac{1}{2}\|P\|^2\left(\sum_l \|H_{b,l}\|e^{j\kappa(i+b-1-(N_{preamble}-4.5)-b)(\varepsilon_{\mathit{eff},b}+l\eta)} + \sum_l \|H_{b,l}\|e^{j\kappa(i+3+b-1-(N_{preamble}-4.5)-b)(\varepsilon_{\mathit{eff},b}+l\eta)}\right)$$

$$= \frac{1}{2}\|P\|^2\sum_l \|H_{b,l}\|\left(e^{j\kappa(i-1-(N_{preamble}-4.5))(\varepsilon_{\mathit{eff},b}+l\eta)} + e^{j\kappa(i+3-1-(N_{preamble}-4.5))(\varepsilon_{\mathit{eff},b}+l\eta)}\right)$$

$$= \|P\|^2 \sum_l \|H_{b,l}\|$$

$$e^{j\kappa(i+0.5-(N_{preamble}-4.5))(\varepsilon_{\mathit{eff},b}+l\eta)} \cos\left(\frac{3\kappa}{2}(\varepsilon_{\mathit{eff},b}+l\eta)\right)$$

$$= \|P\|^2 \sum_l \|H_{b,l}\|$$

$$e^{j\kappa(i-(N_{preamble}-5))(\varepsilon_{\mathit{eff},b}+l\eta)} \cos\left(\frac{3\kappa}{2}(\varepsilon_{\mathit{eff},b}+l\eta)\right)$$

$$\approx \|P\|^2 \sum_l \|H_{b,l}\|e^{j\kappa(i-(N_{preamble}-5))(\varepsilon_{\mathit{eff},b}+l\eta)}$$

$$\approx \|P\|^2 e^{j\kappa(i-(N_{preamble}-5))\varepsilon_{\mathit{eff},b}} \sum_{l>0} \|H_{b,l}\|$$

$$2\cos(\kappa(i-(N_{preamble}-5))l\eta)$$

$$= \|P\|^2 e^{j\phi_{b,i}} \sum_{l>0} \|H_{b,l}\| 2\cos(\kappa(i-(N_{preamble}-5))l\eta)$$

where $$\phi_{b,i} = \kappa(i-(N_{preamble}-5))\varepsilon_{\mathit{eff},b}$$

In Eq. 59, the first approximation using the cosine of a very small angle is approximately one. The second approximation of Eq. 59 becomes an equality in AWGN, and $\phi_i$ can be estimated as:

$$\hat{\phi}_{b,i} = \tan^{-1}\left(\frac{\mathrm{Im}(\bar{Y}_{rm,i,b})}{\mathrm{Re}(\bar{Y}_{rm,i,b})}\right) \qquad \text{Eq. (60)}$$

Where $\phi_i = 1 \times \phi_{1,i}$, the estimation of $\phi_1$, denoted by $\hat{\phi}_1$ may be expressed as:

$$\hat{\phi}_i = \frac{1}{3}(c_1\hat{\phi}_{1,i} + c_2\hat{\phi}_{2,i} + c_3\hat{\phi}_{3,i}) \text{ where} \qquad \text{Eq. (61)}$$

$$c_1 = 1, \ c_2 = \frac{f_{c,1}}{f_{c,2}}, \ c_3 = \frac{f_{c,1}}{f_{c,3}}$$

The loop structure shown in FIG. 2, FIG. 4, and FIG. 6 may then be used to track $\phi_i$ for TFI. Since i for the loop starts from ($N_{preamble}+1$) (first symbol of the header) and the loop estimates the phase every $N_{acc}=6$ symbols, i can be normalized to start from 0, and let $k=\lfloor i/6 \rfloor \times 6$. The estimated phase factor of band b for TFI can by expressed as:

$$\hat{\theta}_{k,b,l} = \frac{1}{c_b}\hat{\phi}_k + l\frac{\hat{\phi}_k}{f_{c,1}NT_s} + \kappa(k+6)l\delta^c \qquad \text{Eq. (62)}$$

For symbols $i \in [k,k+5]$, the corrected weighted received tones $\hat{Y}_{i,l}^c$ for TFI may be expressed as:

$$\tilde{Y}_{i,l}^c = \tilde{Y}_{i,l}e^{-j\hat{\theta}_{k,b,l}} \qquad \text{Eq. (63)}$$

The error signal entering the loop filter for TFI may be expressed as:

$$e_k = \frac{1}{3}(e_{1,k} + e_{2,k} + e_{3,k}) \text{ where} \qquad \text{Eq. (64)}$$

$$e_{b,k} = c_b \tan^{-1}\left(\frac{\mathrm{Im}(\bar{Y}_{rm,k,b}^c)}{\mathrm{Re}(\bar{Y}_{rm,k,b}^c)}\right) \text{ and}$$

$$\bar{Y}_{rm,k,b}^c = \frac{1}{2}\left(\sum_l \tilde{Y}_{rm,k+b-1,l}^c + \sum_l \tilde{Y}_{rm,k+3+b-1,l}^c\right)$$

Where one estimation is used to correct for six symbols, $i \in [k,k+5]$, as described in this exemplary embodiment for TFI, the phase error is $\theta_{e,b,i}=\pm 1.5\kappa(\varepsilon_{\mathit{eff},b}+l\eta)$ which is a similar order to that for the FFI case.

Time Frequency Interleaving 2

In an exemplary phase tracking method for multiple symbols for TFI2 with $N_{acc}=6$ symbols, each band has 3 symbols. For each band, the twelve pilot tones of a symbol may be summed first, and then averaged over three symbols. The approximated desired part of the averaging results of symbols [i,i+5] of band b (b=1, 2) may be expressed as:

$$\tilde{Y}^D_{rm,i,b} = \frac{1}{3}\left(\sum_l \tilde{Y}^D_{rm,i+b-1,l} + \sum_l \tilde{Y}^D_{rm,i+2+b-1,l} + \sum_l \tilde{Y}^D_{rm,i+4+b-1,l}\right) \quad \text{Eq. (65)}$$

$$= \frac{1}{3}\|P\|^2 \sum_l \|H_{b,l}\| \begin{pmatrix} e^{jk(i-1-(N_{preamble}-4))(\varepsilon_{eff,b}+l\eta)} + \\ e^{jk(i+2-1-(N_{preamble}-4))(\varepsilon_{eff,b}+l\eta)} + \\ e^{jk(i+4-1-(N_{preamble}-4))(\varepsilon_{eff,b}+l\eta)} \end{pmatrix}$$

$$= \frac{1}{3}\|P\|^2 \sum_l \|H_{b,l}\| e^{jk(i-(N_{preamble}-3))(\varepsilon_{eff,b}+l\eta)} e^{jk2(\varepsilon_{eff,b}+l\eta)}$$

$$\frac{\sin(3\kappa(\varepsilon_{eff,b}+l\eta))}{\sin(\kappa(\varepsilon_{eff,b}+l\eta))}$$

$$= \frac{1}{3}\|P\|^2 \sum_l \|H_{b,l}\| e^{jk(i-(N_{preamble}-5))(\varepsilon_{eff,b}+l\eta)}$$

$$\frac{\sin(3\kappa(\varepsilon_{eff,b}+l\eta))}{\sin(\kappa(\varepsilon_{eff,b}+l\eta))}$$

$$\approx \|P\|^2 \sum_l \|H_{b,l}\| e^{jk(i-(N_{preamble}-5))(\varepsilon_{eff,b}+l\eta)}$$

$$\approx \|P\|^2 e^{jk(i-(N_{preamble}-5))\varepsilon_{eff,b}} \sum_{l>0} \|H_{b,l}\|$$

$$2\cos(\kappa(i-(N_{preamble}-5))l\eta)$$

$$= \|P\|^2 e^{j\phi_{b,i}} \sum_{l>0} \|H_{b,l}\| 2\cos(\kappa(i-(N_{preamble}-5))l\eta) \text{ where}$$

$$\phi_{b,i} = \kappa(i-(N_{preamble}-5))\varepsilon_{eff,b}$$

The estimated phase factor of band b for symbols i∈[k,k+5] for TFI2 can by expressed as:

$$\hat{\theta}_{k,b,l} = \frac{1}{c_b}\hat{\phi}_k + l\frac{\hat{\phi}_k}{f_{c,1}NT_s} + \kappa(k+6)l\delta^c \quad \text{Eq. (66)}$$

The error signal entering the loop filter for TFI2 may be expressed as:

$$e_k = \frac{1}{2}(e_{1,k} + e_{2,k}) \text{ where} \quad \text{Eq. (67)}$$

$$e_{b,k} = c_b \tan^{-1}\left(\frac{\text{Im}(\tilde{Y}^c_{rm,k,b})}{\text{Re}(\tilde{Y}^c_{rm,k,b})}\right)$$

and $$\tilde{Y}^c_{rm,k,b} = \frac{1}{3}\left(\sum_l \tilde{Y}^c_{rm,k+b-1,l} + \sum_l \tilde{Y}^c_{rm,k+2+b-1,l} + \sum_l \tilde{Y}^c_{rm,k+4+b-1,l}\right)$$

Where one estimation is used to correct for six symbols, i∈[k,k+5], as described in this exemplary embodiment for TFI2, the phase error is $\theta_{e,b,l} = \pm 2.0\kappa(\varepsilon_{eff,b}+l\eta)$, which is a similar order to that for the FFI case.

Figure 8:
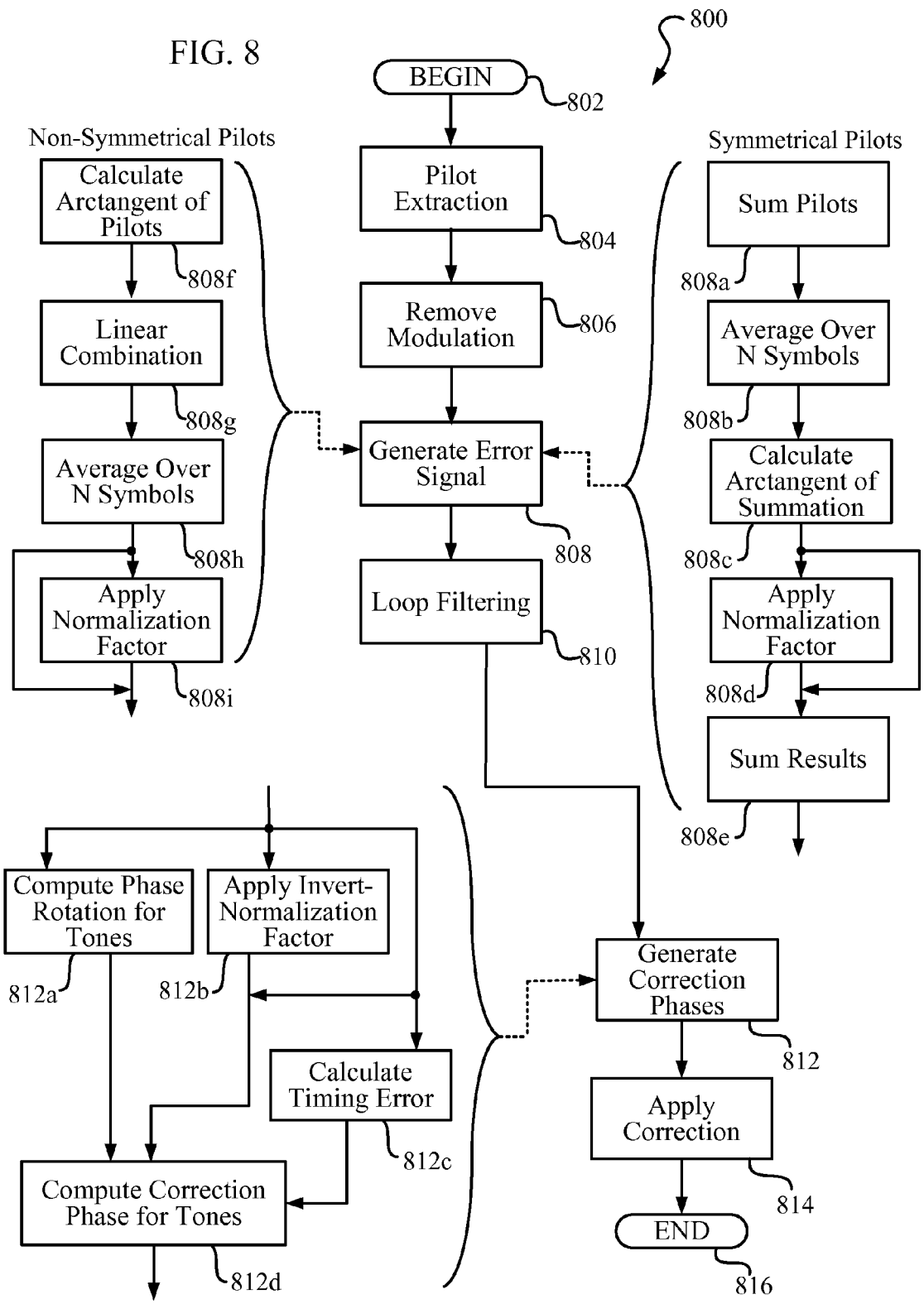
FIG. 8 is a flowchart illustrating a method for multiple-symbol phase tracking in the frequency domain in a wireless communication system.

FIG. 8 shows a flowchart illustrating a multiple-symbol phase tracking method 800 for phase tracking in the frequency domain in a wireless communication system, for example, the phase tracking system 200 shown in FIG. 2. Method 800 may also include use of an error signal generator 900 shown in FIG. 9. The method 800 may begin, or be called to operate, with block 802.

In block 804, pilot tones are extracted from one or more first symbols, for example, pilot tones may be extracted from one or more weighted OFDM symbols and/or a corrected OFDM symbols. The one or more first symbols may be considered one or more first symbols in a series of symbols, or an intermediate group of one or more symbols in the series that is first in relation to one or more subsequent symbols in the series. In block 806, the extracted pilot tones of block 804 are demodulated.

In block 808, an error signal is generated. In the case of symmetrically located pilot tones, block 808 may include the steps shown in block 808a, block 808b, block 808c, and block 808d. In block 808a, the demodulated pilot tones of an OFDM symbol may be summed to remove the SFO component of the phase information. In block 808b, the summed demodulated pilot tones may then be averaged over the $N_{acc}$ symbols. For example, $N_{acc}$ may be selected to be 6. In block 808b, Eq. 53, Eq. 59 and Eq. 65 may be used for different frequency hopping cases. In block 808c, the arctangent of the averaged summed demodulated pilot tones may be calculated. In addition, in block 808d, a normalization factor may be applied to normalize the different carrier frequency effect for frequency hopping systems, for example, systems like WiMedia. In block 808d, Eq. 58, Eq. 64 and Eq. 67 may be used for different frequency hopping cases. In block 808e, the results of block 808c and any normalizations process employed in block 808d are summed.

In block 808, in the case of pilot tones that are not located symmetrically around the DC, block 808 may include the steps shown in block 808f, block 108g, block 808h, and block 808i. In block 808f, the arctangent of each pilot tone of an OFDM symbol is calculated to get the phase information of each pilot. In block 808g, a linear combination of the phase information of block 808f may be used to remove the SFO component. In block 808h, the phase information output of the linear combination process may then be averaged over the $N_{acc}$ symbols. Similarly to the case of symmetrical pilot tones and block 808d, in block 808i, a normalization factor may be applied to normalize the different carrier frequency effect for frequency hopping systems.

In block 810, the error signal of block 808 is passed through a loop filter, for example, loop filter 228 (see FIG. 2), to obtain a phase rotation due to the residual CFO. In block 812, correction phases for tones may be generated by and angle generator, for example, by angle generator 230 (see FIG. 2) for $N_{acc}$ symbols. Generating the correction phases may include the steps shown in blocks 812a, 812b, 812c, and 812d.

In block 812a, a phase rotation due to the SFO for the tones of a symbol may be computed. The phase rotation due to the SFO may be calculated using the output of a coarse CFO estimator, for example, course CFO estimator 236 (see FIG. 2), and the estimated phase rotation due to the residual CFO, for example, by using the output of loop filter 228 as shown in FIG. 2.

In block 812b, an invert-normalization factor may be applied to phase rotation due to the residual CFO to compensate the different carrier frequency effect for frequency hopping systems. Block 812b may include the use of Eq. 56, Eq. 62, and Eq. 66. In block 812c, the timing error due to SFO may be calculated in order to determine whether the SFO in the time domain exceeds a sample. In block 812d, a correction phase for the tones may be calculated by summing the estimated phase rotation due to the residual CFO with a corresponding computed phase rotation due to SFO.

In block 814, the correction phases generated in block 812 are used to generate correction coefficients for subsequent symbols, for example, the next $N_{acc}$ OFDM symbols in the frequency domain. In block 816, the multiple-symbol phase tracking method 800 terminates.

Figure 9:
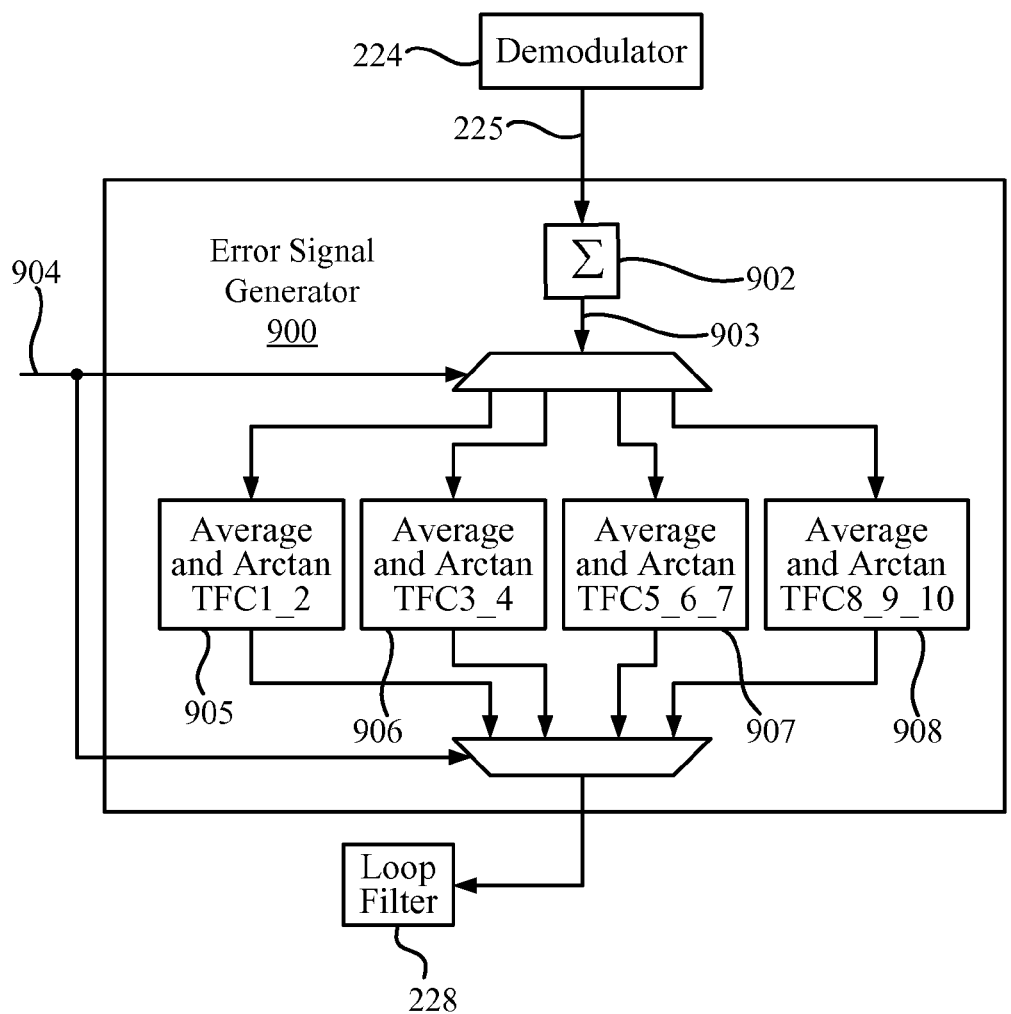
FIG. 9 is a block diagram of an error signal generator, including a plurality of average-and-arctangent blocks, for a system for multiple-symbol phase tracking in the frequency domain in a wireless communication system.

FIG. 9 shows a functional block diagram of the error signal generator 900 for systems having symmetrically located pilot tones, such as but not limited to, a WiMedia UWB system, and the demodulator 224 and loop filter 228 previously described with reference to FIG. 2, and an angle generator 904. As previously described, the pilot loop signal is processed by demodulator 224 which provides the pilot phase information signal on line 225. Error signal generator 900 then provides the error signal to loop filter 228. Error signal generator 900 may include a summation block 902, and average arctangent blocks 905, 906, 907 and 908.

Summation block 902 may sum the pilot phase information signal on line 225 of the pilot tones of a symbol to remove the phase component due to SFO. A TFC selection signal on a line 904 may designate which of the average-and-arctangent blocks 905, 906, 907 and/or 908 to use to generate the error signal. Block 905 may generate the error signal for TFC1 and TFC2. Block 906 may generate the error signal for TFC3 and TFC4. Block 907 may generate the error signal for TFC5, TFC6 and TFC7. And, Block 908 may generate the error signal for TFC8, TFC9 and TFC10.

FIGS. 10A-D show functional block diagrams illustrating the generation of error signals for average-and-arctangent blocks 905, 906, 907, and 908, respectively, for the case of $N_{acc}$=6. A buffer 909 in FIGS. 10A-D illustrates that six symbols may be used for averaging. Average-and-Arctangent blocks 905 and 906 may be employed in TFI systems. Average-and-Arctangent blocks 905 and 906 may illustrate the use of Eq. 64. Average-and-Arctangent block 907 may be employed in FFI systems. Average-and-Arctangent block 907 may illustrate the use of Eq. 58. Average-and-Arctangent block 908 may be employed in TFI2 systems. Average-and-Arctangent blocks 908 illustrate the use of Eq. 67.

Figure 10A:
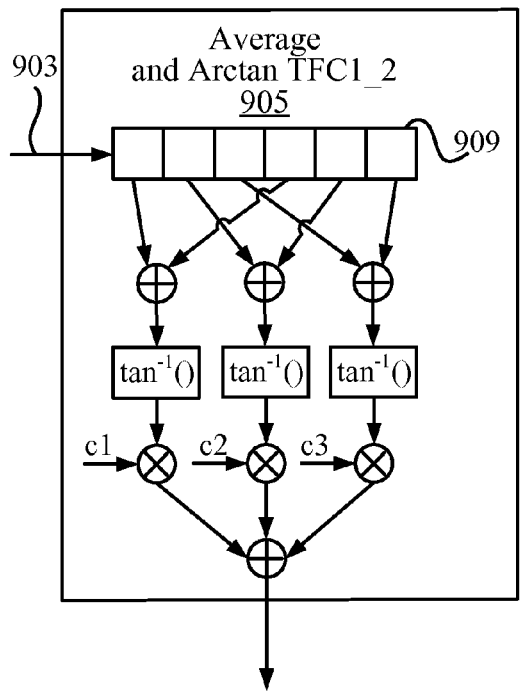
FIGS. 10A-D are block diagrams illustrating the average-and-arctangent blocks of FIG. 9.
Figure 10B:
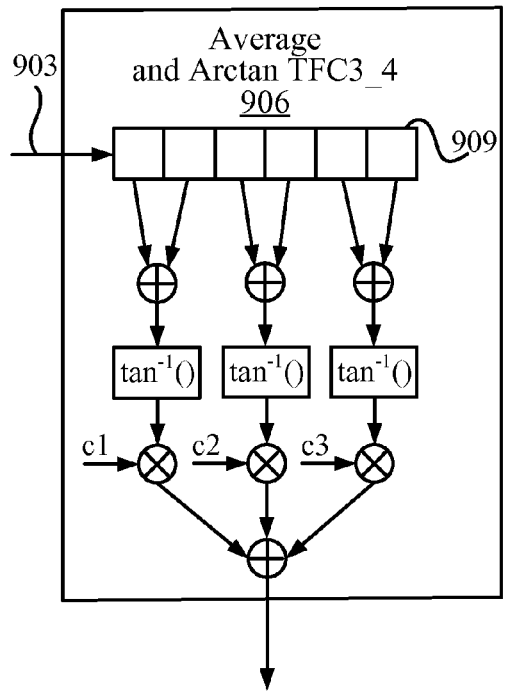
Figure 10C:
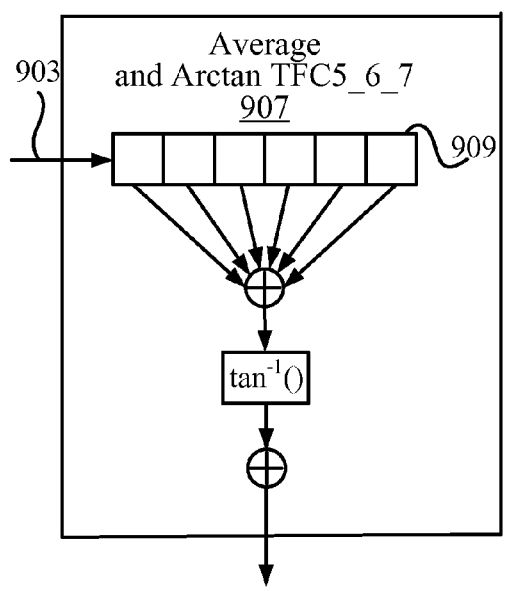
Figure 10D:
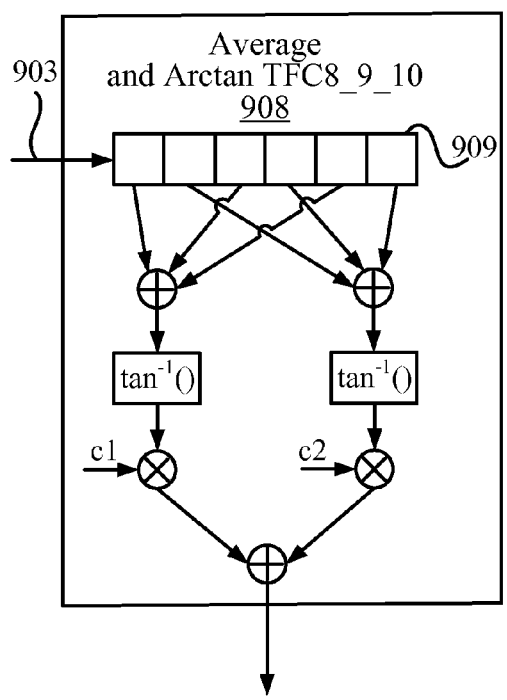

TFC5, TFC6 and TFC7 are FFI case, and FIG. 10C illustrates the use of Eq. 58. TFC8, TFC9 and TFC10 are TFI2 case, and FIG. 10D illustrates the use of Eq. 67. The functions illustrated in FIGS. 10A-D may be incorporated into block 808 of method 800 of FIG. 8.

Figure 11:
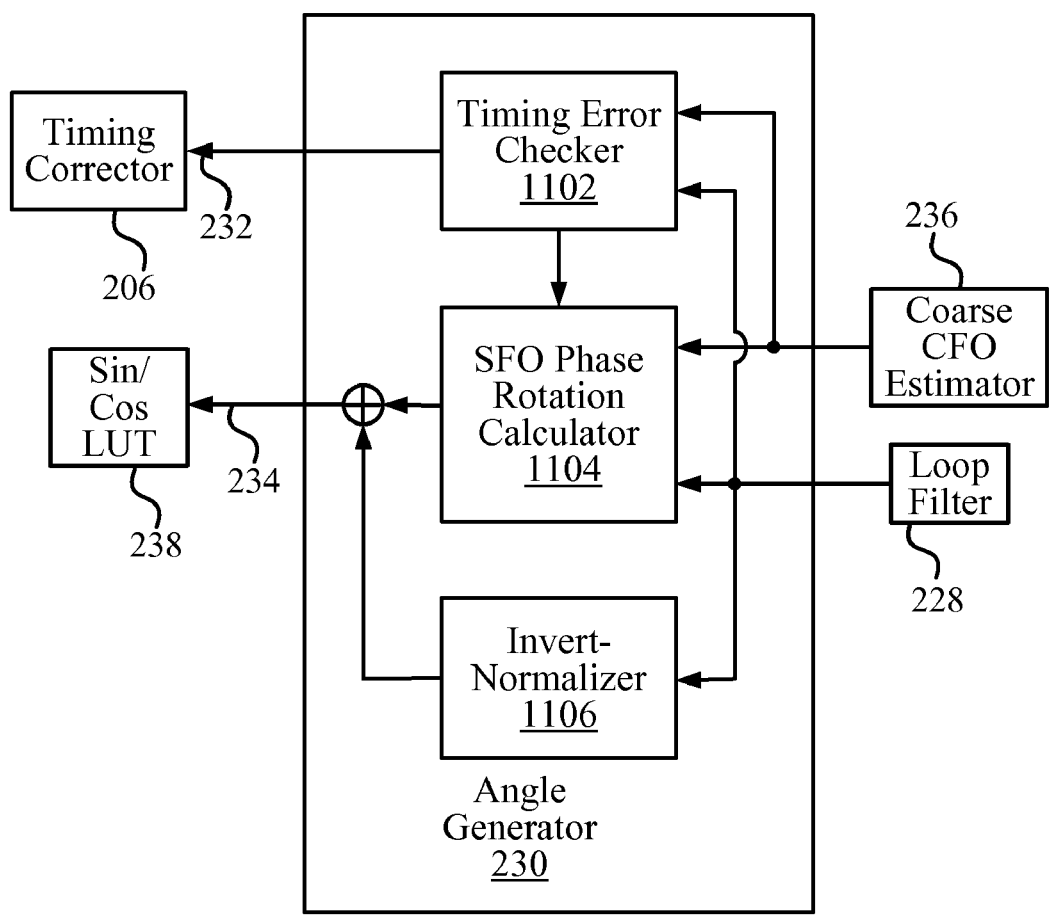
FIG. 11 is a block diagram of an angle generator of the system of FIG. 2.

FIG. 11 shows a functional block diagram of angle generator 230 of FIG. 2. Angle generator 230 may include a timing error checker 1102, an SFO phase rotation calculator 1104, and an invert-normalizer 1106. Timing error corrector 1102 may perform functions associated with blocks 112c (FIG. 1) and/or 812c (FIG. 8), based on inputs provided by loop filter 228 and course CFO estimator 236. Timing error corrector 1102 may provide the sample adjustment signal on line 232. The SFO phase rotation calculator 1104 may perform the functions associated with blocks 112a and/or 112d (FIG. 1), and/or 812a and/or 812d (FIG. 8), based on inputs provided by loop filter 228 and course CFO estimator 236. Invert-Normalizer 1106 may perform the functions associated with blocks 112b (FIG. 1) and/or 812b (FIG. 8), based on inputs provided by loop filter 228. The SFO phase rotation calculator 1104 and the invert-normalizer 1106 may provide the components for the phase correction signal on line 234.

Timing Correction

While tracking and correcting phase rotation pursuant to the methods previously described herein, the optimal timing window established by a symbol timing estimator (not shown) may drift away in the time domain due to the SFO. This may be addressed by repeating or skipping a sample depending upon whether the receiver clock (not shown) is faster or slower than the transmitter clock (not shown).

The determination of whether to repeat or skip a symbol may be determined as follows: First, where the receiver sampling period may be expressed as $T_s'=(1+\eta)T_s$, and the time difference, between the transmitter and the receiver, in one OFDM symbol is expressed as $\Delta=N_{SYM}(T_s'-T_s)=N_{SYM}T_s\eta$, the number of OFDM symbols needed to be off by one sample may be expressed as: $N_{OFDM}=1/(N_{SYM}\eta)$. Second, the phase rotation for the $l^{th}$ tone of the $i^{th}$ symbol due to the SFO only may be expressed as $$2\pi \frac{N_{SYM}}{N_{FFT}} l\eta(i+C),$$

where C is a small constant.

Therefore, for $i=m \times N_{OFDM}-C$, the phase rotation on the $l^{th}$ tone is given by $$m\frac{2\pi l}{N_{FFT}},$$

For example, if $$l = \frac{N_{FFT}}{2}, \text{ then } m\frac{2\pi N_{FFT}/2}{N_{FFT}} = m\pi.$$

Thus, for multiple-symbol algorithms where $N_{acc}$=6, and $\hat{\phi}_{SFO,k,l}$ denotes the estimated phase rotation due to SFO only, we have $$\hat{\phi}_{SFO,k,64} = \kappa(k+6)\hat{\eta}_k 64 \qquad \text{Eq. (68)}$$

$$= \begin{cases} 64\left(\dfrac{\hat{\phi}_k}{f_c N T_s} + \kappa(k+6)\delta^c\right) & \text{for } FFI \\ 64\left(\dfrac{\hat{\phi}_k}{f_{c,1} N T_s} + \kappa(k+6)\delta^c\right) & \text{for } TFI \text{ and } TFI2 \end{cases}$$

If $\hat{\phi}_{SFO,k,l}=\pm m \times \pi$, a sample should be skipped or repeated in the time domain after the next six symbols in order to maintain correct timing.

Once the timing in the time domain is corrected by one sample, the phase of each tone in the frequency domain may be adjusted by a corresponding amount. Where $N_{shift\_samples}$ denotes the number of repeated and skipped samples, the adjustment for the $l^{th}$ tone may be expressed as $$\frac{2\pi l}{N} N_{shift\_samples}.$$

The advantages of the systems and methods described herein include that for many cases, for example, a SFO of 40 ppm and residual CFO less than 40 kHz, the symbols per inter-carrier interference (S/ICI) is sufficiently high that SFO and CFO may be corrected in the frequency domain.

The functionality, operations and architecture depicted by the blocks of method 100 and method 800 may be implemented using modules, segments, and/or portions of software and/or firmware code. The modules, segments, and/or portions of code include one or more executable instructions for implementing the specified logical function(s). In some implementations, the functions noted in the blocks may occur in a different order than that shown in FIG. 1 and FIG. 8. For example, two blocks shown in succession in FIG. 1 and/or FIG. 8 may be executed concurrently or the blocks may sometimes be executed in another order, depending upon the functionality involved.

Those of skill will further appreciate that the various illustrative functional blocks, modules, circuits, and steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the appended claims.

The various illustrative functional blocks, modules, and circuits disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors or DSPs, one or more microprocessors in conjunction with a DSP core, or any other such configuration.

Software/firmware implementing any of the functions, blocks or processes disclosed herein may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

If implemented in software, the methods, blocks, algorithms, and functions described herein may be stored on or transmitted over as instructions or code on one or more computer-readable media. Computer-readable medium includes both computer storage medium and communication medium, including any medium that facilitates transfer of a computer program from one place to another. A storage medium may be any available medium that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable medium.

The above description of the disclosed embodiments is provided to enable any person skilled in the art to make or use that which is defined by the appended claims. The following claims are not intended to be limited to the disclosed embodiments. Other embodiments and modifications will readily occur to those of ordinary skill in the art in view of these teachings. Therefore, the following claims are intended to cover all such embodiments and modifications when viewed in conjunction with the above specification and accompanying drawings.

What is claimed is:

1. An apparatus, comprising:
a pilot extractor configured to extract a plurality of pilot tones from one or more first symbols;
a demodulator configured to demodulate the pilot tones;
an error signal generator configured to generate an error signal by combining and calculating the arctangent of the plurality of demodulated pilot tones;
a loop filter configured to filter the error signal to generate an estimated phase rotation due to a residual CFO;
an angle generator configured to generate a correction phase for the plurality of tones, based on the estimated phase rotation; and
a device configured to apply the correction phase to one or more symbols subsequent to the one or more first symbols.

2. The apparatus of claim 1, wherein an input to the pilot extractor includes a phase rotation factor.

3. The apparatus of claim 2, wherein a plurality of symbols are used to generate the estimation.

4. The apparatus of claim 2, wherein a multiple of six symbols is used to generate the estimation.

5. The apparatus of claim 1, wherein the one or more first symbols are OFDM symbols.

6. The apparatus of claim 1, wherein the demodulator is configured to demodulate the pilot tones by multiplying the pilot tones by a complex conjugate of a corresponding referent pilot.

7. The apparatus of claim 1, wherein the demodulator is configured to produce a loop signal that includes a phase rotation due to SFO and residual CFO.

8. The apparatus of claim 1, wherein the error signal generator is configured to generate an error signal by summing the plurality of the demodulated pilot tones and calculating the arctangent of the summed demodulated pilot tones.

9. The apparatus of claim 1, wherein the error signal generator is configured to generate an error signal by calculating the arctangent of the plurality of pilot tones and performing a linear combination of the phase information from the pilot tones.

10. The apparatus of claim 1, wherein the error signal generator is configured to apply a normalization factor to normalize the different carrier frequency effect.

11. The apparatus of claim 1, wherein the error signal generator is configured to sum and then average the plurality of demodulated pilot tones.

12. The apparatus of claim 1, wherein the error signal may be expressed as one of a group consisting of:

$$\tan^{-1}\left(\frac{\text{Im}\left(\sum_{i=k}^{K+5}\sum_{l}\tilde{Y}_{rm,i,l}^{c}\right)}{\text{Re}\left(\sum_{i=k}^{K+5}\sum_{l}\tilde{Y}_{rm,i,l}^{c}\right)}\right), \frac{1}{3}(e_{1,k}+e_{2k}+e_{3,k}), \text{ and } \frac{1}{3}(e_{1,k}+e_{2,k}).$$

13. The apparatus of claim 1, wherein the error signal generator may include a calculation that may be expressed as one of a group consisting of:

$$\tan^{-1}\left(\frac{\text{Im}\left(\sum_{i=k}^{K+5}\sum_{l}\tilde{Y}_{rm,i,l}^{c}\right)}{\text{Re}\left(\sum_{i=k}^{K+5}\sum_{l}\tilde{Y}_{rm,i,l}^{c}\right)}\right), \frac{1}{3}(e_{1,k}+e_{2k}+e_{3,k}), \text{ and } \frac{1}{2}(e_{1,k}+e_{2,k}).$$

14. The apparatus of claim 1, further including a timing corrector configured to repeat or skip one or more samples of a received signal based upon a sample adjustment signal provided by the angle generator.

15. The apparatus of claim 14, wherein the sample adjustment signal depends upon the timing difference between a receiver clock and a transmitter clock.

16. The apparatus of claim 1, further including a Sin/Cos look up table configured to provide a channel update signal based upon the correction phase.

17. The apparatus of claim 1, wherein the angle generator is configured to generate a correction phase for the plurality of tones by summing the estimated phase rotation due to the residual CFO with a corresponding computed phase rotation due to SFO.

18. The apparatus of claim 17, wherein the angle generator is configured to generate a correction phase for the plurality of tones by summing the estimated phase rotation due to the residual CFO with a corresponding computed phase rotation due to SFO, and by offsetting the phase rotation due to SFO by a corresponding amount to compensate the phase rotation due to a sample repeat or a sample skip process.

19. The apparatus of claim 17, wherein the phase rotation due to the SFO is calculated using the output of a coarse CFO estimator and the estimated phase rotation due to the residual CFO and an invert-normalization factor is applied to the phase rotation due to the residual CFO to compensate the different carrier frequency effect for frequency hopping systems.

20. The apparatus of claim 17, wherein the phase rotation due to the SFO is calculated using the output of a coarse CFO estimator and the estimated phase rotation due to the residual CFO, and phase rotation due to SFO is offset to compensate for a sample repeat or a sample skip process.

21. The apparatus of claim 1, wherein the device includes means for applying the correction phase to one or more symbols subsequent to the one or more first symbols in the frequency domain.

22. An apparatus, comprising:
means for collecting a plurality of modulated weighted pilot tones associated with one or more first symbols;
means for demodulating the plurality of modulated weighted pilot tones; and
means for generating an error signal by summing the plurality of demodulated weighted pilot tones and then calculating the arctangent of the summed demodulated weighted pilot tones;
means for generating an estimated phase rotation due to a residual CFO and based on the error signal;
means for generating a correction phase for the plurality of tones, based on the estimated phase rotation; and
means for applying the correction phase to one or more symbols subsequent to the one or more first symbols.

23. A method for correcting a sampling frequency offset (SFO) and a carrier frequency offset (CFO) in a wireless communication system, comprising:
collecting a plurality of modulated weighted pilot tones associated with one or more first symbols;
demodulating the plurality of modulated weighted pilot tones;
generating an error signal by summing and then calculating the arctangent of the plurality of demodulated weighted pilot tones;
passing the error signal through a loop filter to generate an estimated phase rotation due to a residual CFO;
generating a correction phase based on the estimated phase rotation; and
applying the correction phase to one or more symbols subsequent to the one or more first symbols.

24. A computer-readable medium embodying a set of instructions executable by one or more processors, comprising:
code for collecting a plurality of modulated weighted pilot tones associated with one or more first symbols;
code for demodulating the plurality of modulated weighted pilot tones;
code for generating an error signal by summing and then calculating the arctangent of the plurality of demodulated weighted pilot tones;
code for passing the error signal through a loop filter to generate an estimated phase rotation due to a residual CFO;
code for generating a correction phase based on the estimated phase rotation; and
code for applying the correction phase to one or more symbols subsequent to the one or more first symbols.

* * * * *